US012734436B2

(12) United States Patent
Blades et al.

(10) Patent No.: US 12,734,436 B2
(45) Date of Patent: Sep. 15, 2026

(54) SYSTEM AND METHOD FOR SYNTHESIZING SENSOR READINGS

(71) Applicant: Orpyx Medical Technologies Inc., Calgary (CA)

(72) Inventors: Samuel Carl William Blades, Victoria (CA); Omar Suleman, Calgary (CA); Patrick Dobbie, Calgary (CA)

(73) Assignee: ORPYX MEDICAL TECHNOLOGIES INC., Calgary (CA)

( * ) Notice: Subject to any disclaimer, the term of this patent is extended or adjusted under 35 U.S.C. 154(b) by 603 days.

(21) Appl. No.: 17/988,468

(22) Filed: Nov. 16, 2022

(65) Prior Publication Data

US 2023/0158398 A1 May 25, 2023

Related U.S. Application Data

(60) Provisional application No. 63/282,234, filed on Nov. 23, 2021.

(30) Foreign Application Priority Data

Sep. 28, 2022 (CA) ................................ CA 3176340

(51) Int. Cl.
*A63F 13/212* (2014.01)
*A63F 13/218* (2014.01)
*A63F 13/285* (2014.01)

(52) U.S. Cl.
CPC .......... *A63F 13/212* (2014.09); *A63F 13/218* (2014.09); *A63F 13/285* (2014.09);
(Continued)

(58) Field of Classification Search
CPC .... A63F 13/212; A63F 13/218; A63F 13/285; A63F 2300/1012; A63F 2300/1037; A63F 2300/1056; A63F 13/22
See application file for complete search history.

(56) References Cited

U.S. PATENT DOCUMENTS

| | | | |
|---|---|---|---|
| 5,955,667 | A | 9/1999 | Fyfe |
| 10,034,622 | B1 | 7/2018 | Mahmoud |

(Continued)

FOREIGN PATENT DOCUMENTS

| | | | |
|---|---|---|---|
| CN | 105708469 | A | 6/2016 |
| KR | 102260470 | B1 | 11/2020 |

(Continued)

OTHER PUBLICATIONS

Haibin Liu et al 2020 J. Phys.: Conf. Ser. 1453 012009, IOP Publishing, doi: 10.1088/1742-6596/1453/1/012009, online: https://iopscience.iop.org/article/10.1088/1742-6596/1453/1/012009—paragraph numbers added (Year: 2020).*

(Continued)

*Primary Examiner* — Catherine T. Rastovski
*Assistant Examiner* — Toni D Sauncy
(74) *Attorney, Agent, or Firm* — ABM INTELLECTUAL PROPERTY INC.; Adrienne Bieber McNeil

(57) ABSTRACT

A system, method and computer program product for synthesizing sensor data in a wearable device. Sensor readings are obtained from a plurality of sensors, the plurality of sensors arranged in a first predetermined pattern, where the first predetermined pattern maps each of the plurality of sensors to respective locations on the wearable device. Based on the plurality of sensor readings and a plurality of estimation weights, a plurality of synthesized sensor readings are estimated for a corresponding plurality of synthesized sensors. The plurality of synthesized sensors are arranged in a second predetermined pattern, wherein the second predetermined pattern maps each of the plurality of synthesized sensors to respective locations on the wearable device. The plurality of sensor readings and the plurality of synthesized sensor readings can be output to provide a (Continued)

comprehensive set of sensor readings. The estimation weights can be optimized in a preprocessing phase.

16 Claims, 10 Drawing Sheets

(52) U.S. Cl.
CPC ................ *A63F 2300/1012* (2013.01); *A63F 2300/1037* (2013.01); *A63F 2300/1056* (2013.01)

(56) References Cited

U.S. PATENT DOCUMENTS

| | | | | |
|---|---|---|---|---|
| 2011/0054358 | A1 | 3/2011 | Kim et al. | |
| 2014/0066816 | A1 | 3/2014 | McNames et al. | |
| 2014/0343889 | A1 | 11/2014 | Shalom et al. | |
| 2015/0065893 | A1 | 3/2015 | Ye | |
| 2016/0007935 | A1 * | 1/2016 | Hernandez | A61B 5/024 600/595 |
| 2017/0191831 | A1 * | 7/2017 | Karahan | G01P 15/00 |
| 2018/0046215 | A1 * | 2/2018 | Gosieski, Jr. | G06F 30/17 |
| 2020/0000373 | A1 * | 1/2020 | Agrawal | A61B 5/7405 |
| 2020/0218974 | A1 | 7/2020 | Cheng | |

FOREIGN PATENT DOCUMENTS

| | | | |
|---|---|---|---|
| LU | 101071 | B1 | 6/2020 |
| WO | 2009152456 | A2 | 12/2009 |
| WO | 2014089238 | A1 | 6/2014 |
| WO | 2017157604 | A1 | 9/2017 |
| WO | 2020152817 | A1 | 7/2020 |
| WO | 2021092676 | A1 | 5/2021 |

OTHER PUBLICATIONS

Eom, et al., "A Deep Learning-Based Optimal Smart Shoes Sensor Selection for Energy Expenditure and Heart Rate Estimation", Sensors 2021, 21, 7058. https://doi.org/10.3390/s21217058 (Year: 2021).*

SABOOR_Saboor, et al., "Latest Research Trends in Gait Analysis Using Wearable Sensors and Machine Learning: A Systematic Review," in IEEE Access, vol. 8, pp. 167830-167864, 2020 (Year: 2020).*

Chatzaki, et al."The Smart-Insole Dataset: Gait Analysis Using Wearable Sensors with a Focus on Elderly and Parkinson's Patient", Sensors 2021, 21, 2821 (Year: 2021).*

Jung, et al., "Ensemble Learning Using Pressure Sensor for Gait Recognition", 2021 IEEE Region 10 Symposium (TENSYMP) (2021): 1-3 (Year: 2021).*

Sunarya, et al., "Feature Analysis of Smart Shoe Sensors for Classification of Gait Patterns", Sensors 2020, 20(21), 6253; (Year: 2020).*

Todd C. Pataky, Spatial resolution in plantar pressure measurement revisited, Journal of Biomechanics, 2012, pp. 2116-2124, 45(12).

M. Holtzman et al., Force Estimation with a Non-Uniform Pressure Sensor Array, 2008 IEEE Instrumentation and Measurement Technology Conference, 2008, pp. 1974-1979.

Sarah Ostadabbas et al., Continuous Plantar Pressure Modeling Using Sparse Sensors, 2012 IEEE 12th International Conference on BioInformatics & BioEngineering (BIBE), 2012, pp. 309-314.

Sarah Ostadabbas, A Knowledge-Based Modeling for Plantar Pressure Image Reconstruction, IEEE Transactions on Biomedical Engineering, 2014, pp. 2538-2549, 61(10).

Wangjoo Lee et al., Characterization of Elastic Polymer-Based Smart Insole and a Simple Foot Plantar Pressure Visualization Method Using 16 Electrodes, Sensors, 2019, 19(1), pp. 44-53.

Alfredo Ciniglio et al., The Design and Simulation of a 16-Sensors Plantar Pressure Insole Layout for Different Applications: From Sports to Clinics, a Pilot Study, 2021, 21(4), pp. 1450-1471.

Canadian Intellectual Property Office (CIPO), Examiner report dated Feb. 29, 2024 in counterpart foreign patent application No. CA 3,176,340.

Shepard, D., "A two-dimensional interpolation function for irregularly-spaced data", ACM '68: Proceedings of the 1968 23rd ACM national conference, pp. 517-524, https://dl.acm.org/doi/abs/10.1145/800186.810616, Jan. 1, 1968 (Jan. 1, 1968).

* cited by examiner 510
520
530
t
$t_1$
$t_x$
$P_{s1}$
$P_{s2}$
$P_{s99}$
$P_{s1t1}$
$P_{s2t1}$
$P_{s99t1}$
$P_{s1tx}$
$P_{s2tx}$
$P_{s99tx}$
stance
swing
stance
swing
stance
n=1
(stance 1)
n=2
(stance 2)
n=z
(stance z)
d
1
100

SYSTEM AND METHOD FOR SYNTHESIZING SENSOR READINGS

CROSS-REFERENCE TO RELATED APPLICATIONS

This application claims the benefit of priority of Canadian Patent Application No. 3,176,340 filed Sep. 28, 2022 and U.S. Provisional Application No. 63/282,234 filed Nov. 23, 2021. Both of the above applications are incorporated herein by reference.

FIELD

This document relates to systems and methods for processing data from sensors monitoring human movement or human activity. In particular, this document relates to synthesizing sensor data at locations between, and outside of, sensors monitoring human movement or human activity.

BACKGROUND

United States Patent Application Publication No. 2011/054358A1 (Kim et al.) discloses a gait/posture analysis method which analyzes a gait/posture of a walker wearing a shoe having one or more pressure sensors attached thereon. The gait/posture analysis method includes: measuring a base foot pressure, which is generated when the walker wears the shoe, at arbitrary time intervals; calculating a representative base foot pressure by using the plurality of base foot pressures measured at the arbitrary time intervals; correcting a foot pressure measured by the pressure sensors by using the representative base foot pressure; calculating a foot-pressure related value, which is to be used for analyzing the gait/posture of the walker, by using the corrected foot pressure; and analyzing the gait/posture of the walker by using the foot-pressure related value.

United States Patent Application Publication No. 2014/343889A1 (Ben Shalom et al.) discloses a system supporting subject risk analysis and risk event management for detecting possible risk indications and the risk of a subject developing pressure injuries. The system includes monitoring risk events using a pressure sensing apparatus and by recording pressure values at a plurality of pixels of a sensing mat to determine subject's pressure distribution and associated pressure image at any given time. The mapping of pressure sensing elements coordinates of the pressure sensing apparatus to a subject-based coordinate system using applicable transformation functions enables risk analysis and display of subject's pressure distribution maps representing gathered data at different times. Pressure images of the subject's pressure distributions helps in identifying postures adopted by a subject, determining risk of a subject developing pressure injuries and registering possible bed-exit and bed-fall risk events.

SUMMARY

The following summary is intended to introduce the reader to various aspects of the detailed description, but not to define or delimit any invention.

A system, method and computer program product for synthesizing sensor data is provided. More particularly, in some examples, a plurality of sensors can be provided in a predetermined arrangement in a sensing unit for equipment or a wearable device. The sensors can be configured to acquire readings relating to human movement or human activity. Based on sensor readings received from the plurality of sensors and a set of estimation weights, sensor readings at locations between the sensors can be estimated. Sensor readings at locations outside the set of sensors can also be estimated using the estimation weights. This may provide the sensing system with high resolution and high fidelity sensor readings while reducing the complexity and cost of the sensing unit.

According to some aspects, the present disclosure provides a method for synthesizing sensor data in a wearable device. The method includes: obtaining a plurality of sensor readings from a corresponding plurality of sensors, the plurality of sensors arranged in a first predetermined pattern, wherein the first predetermined pattern maps each of the plurality of sensors to respective locations on the wearable device; and based on the plurality of sensor readings and a plurality of estimation weights, estimating a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the wearable device.

The plurality of sensors can be pressure sensors.

The wearable device can be worn on a foot.

The wearable device can include a deformable material.

The deformable material can be a foam.

The wearable device can be an insole.

The wearable device can be a shoe.

The wearable device can be a compression-fit garment.

The wearable device can be a sock.

The wearable device can include an inertial measurement unit.

The method can include computing at least one pressure derivative value based on the plurality of sensor readings and the plurality of synthesized sensor readings.

The at least one pressure derivative value can be a ground reaction force.

The at least one pressure derivative value can be a center of pressure.

A plurality of inertial measurement unit sensor readings can be used to compute the at least one pressure derivative value, The at least one pressure derivative value can be an energy expenditure or a rate of energy expenditure.

The method can include outputting an output dataset, which can include the plurality of synthesized sensor readings and/or the at least one pressure derivative value.

The output dataset can further include the plurality of sensor readings.

The output dataset can be used as an input to a game.

The output dataset can be used to execute an action in a game.

A scaling factor can be applied to the output dataset in the game.

The scaling factor can be an integer.

The scaling factor can have a value of 1.

An avatar can be generated in the game with motion defined according to the output dataset.

The output dataset can be used to model the dynamics of virtual objects and surroundings with which a user interacts in the game.

A game score in the game can be calculated based on the output dataset.

A training goal can be generated based on the output dataset and/or the game score.

A percentage of progress towards achieving the training goal can be calculated based on the output dataset and/or the game score.

A technique quality of a user performing a movement can be calculated from the output dataset.

A task readiness score can be calculated from the output dataset and/or the technique quality.

A first user can be challenged to replicate the output dataset of a second user in the game.

The wearable device can include at least one vibrotactile motor.

The at least one vibrotactile motor can generate a haptic signal based on the output dataset.

An audio signal can be generated based on the output dataset.

A visual display can be generated based on the output dataset.

The visual display can be a foot pressure map.

The plurality of estimation weights can be predetermined in a preprocessing phase, and the preprocessing phase can include: obtaining training data, the training data including a plurality of sets of physical sensor readings from physical sensors arranged according to both the first and second predetermined patterns; filtering the training data to obtain filtered training data; using the filtered training data, computing an average sensor reading for each physical sensor to produce an input data set and a reference data set, the input data set including average sensor readings for sensors corresponding to the first predetermined pattern, the reference data set including average sensor readings for sensors corresponding to the second predetermined pattern; and optimizing the estimation weights.

Optimizing the estimation weights can include: initially estimating the estimation weights; computing estimated sensor values based on the input data set and the estimation weights; and performing gradient descent optimization to update the estimation weights, where the gradient descent optimization compares error between the estimated sensor values and the reference data set.

Filtering the training data can include resizing each instance of the training data to a common size.

Filtering the training data can include: dividing the training data into stance data and swing data; and resizing each instance in the set of stance data to a common size.

The plurality of sensor readings can be associated with an activity, and the plurality of synthesized sensor readings can be estimated when the activity is an activity requiring more sensors than can be provided by the plurality of sensors in the first predetermined pattern.

The activity can be running, jogging, walking, or cycling.

The method can include predetermining and optimizing estimation weights associated with a specific activity.

The first predetermined pattern can include at least 32 locations.

The first predetermined pattern can include sensors arranged in a 2-3-4-4-4-3 arrangement in a forefoot portion. The first predetermined pattern can include sensors arranged in a 1-1-1 arrangement in a midfoot portion. The first predetermined pattern can include sensors arranged in a 2-1-2-1-2-1 arrangement in a heel portion.

The second predetermined pattern can include at least 32 locations. The second predetermined pattern can include at least 68 locations.

According to some aspects, there is also provided a system for synthesizing sensor data in a wearable device. The system includes: a plurality of sensors arranged in a first predetermined pattern, with each of the plurality of sensors arranged at respective locations on the wearable device; and one or more controllers communicatively coupled to the plurality of sensors. The one or more controllers are configured to: obtain a corresponding plurality of sensor readings from the plurality of sensors; and based on the plurality of sensor readings and a plurality of estimation weights, estimate a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the wearable device.

The plurality of sensors can be pressure sensors.

The wearable device can be worn on a foot.

The wearable device can include a deformable material.

The deformable material can be a foam.

The wearable device can be an insole.

The wearable device can be a shoe.

The wearable device can be a compression-fit garment.

The wearable device can be a sock.

The system can include an inertial measurement unit.

The one or more controllers can be further configured to compute at least one pressure derivative value based on the plurality of sensor readings and the plurality of synthesized sensor readings.

The at least one pressure derivative value can be a ground reaction force.

The at least one pressure derivative value can be a center of pressure.

The inertial measurement unit can be configured to generate inertial measurement unit sensor readings, and the one or more controllers can be further configured to compute the at least one pressure derivative value using the inertial measurement unit sensor readings.

The at least one pressure derivative value can be an energy expenditure or a rate of energy expenditure.

The one or more controllers can be further configured to output an output dataset, and the output dataset can include the plurality of synthesized sensor readings and/or the at least one pressure derivative value.

The output dataset can further include the plurality of sensor readings.

The one or more controllers can be further configured to use the output dataset as an input to a game.

The one or more controllers can be further configured to execute an action in the game based on the output dataset.

The one or more controllers can be further configured to apply a scaling factor to the output dataset in the game.

The scaling factor can be an integer.

The scaling factor can have a value of 1.

The one or more controllers can be further configured to generate an avatar in the game with motion defined according to the output dataset.

The one or more controllers can be further configured to model the dynamics of virtual objects and surroundings with which a user interacts in the game based on the output dataset.

The one or more controllers can be further configured to compute a game score in the game based on the output dataset.

The one or more controllers can be further configured to generate a training goal based on the output dataset and/or the game score.

The one or more controllers can be further configured to calculate a percentage of progress towards achieving the training goal based on the output dataset and/or the game score.

The one or more controllers can be further configured to determine a technique quality of a user performing a movement based on the output dataset.

The one or more controllers can be further configured to determine a task readiness score based on the output dataset and/or the technique quality.

The one or more controllers can be further configured to challenge a first user to replicate the output dataset of a second user in the game.

The system can include at least one vibrotactile motor.

The at least one vibrotactile motor can be configured to generate a haptic signal based on the output dataset.

The one or more controllers can be further configured to generate an audio signal based on the output dataset.

The one or more controllers can be further configured to generate a visual display based on the output dataset.

The visual display can be a foot pressure map.

The plurality of estimation weights can be predetermined in a preprocessing phase, and the one or more controllers can be configured to perform the preprocessing phase by: obtaining training data, the training data including a plurality of sets of physical sensor readings from physical sensors arranged according to both the first and second predetermined patterns; filtering the training data to obtain filtered training data; using the filtered training data, computing an average sensor reading for each physical sensor to produce an input data set and a reference data set, the input data set including average sensor readings for sensors corresponding to the first predetermined pattern, the reference data set including average sensor readings for sensors corresponding to the second predetermined pattern; and optimizing the estimation weights.

The one or more controllers can be configured to optimize the estimation weights by: initially estimating the estimation weights; computing estimated sensor values based on the input data set and the estimation weights; and performing gradient descent optimization to update the estimation weights, where the gradient descent optimization compares error between the estimated sensor values and the reference data set.

The one or more controllers can be configured to filter the training data by resizing each instance of the training data to a common size.

The one or more controllers can be configured to filter the training data by: dividing the training data into stance data and swing data; and resizing each instance in the set of stance data to a common size.

The plurality of sensor readings can be associated with an activity, and the one or more controllers can be configured to estimate the plurality of synthesized sensor readings when the activity is an activity requiring more sensors than can be provided by the plurality of sensors in the first predetermined pattern.

The activity can be running, jogging, walking, or cycling.

Estimation weights can be activity-specific estimation weights.

The first predetermined pattern can include at least 32 locations.

The first predetermined pattern can include sensors arranged in a 2-3-4-4-4-3 arrangement in a forefoot portion.

The first predetermined pattern can include sensors arranged in a 1-1-1 arrangement in a midfoot portion.

The first predetermined pattern can include sensors arranged in a 2-1-2-1-2-1 arrangement in a heel portion.

The second predetermined pattern can include at least 32 locations. The second predetermined pattern can include at least 68 locations.

The one or more controllers can be wirelessly coupled to the plurality of sensors.

According to some aspects, there is provided a non-transitory computer readable medium storing computer-executable instructions, which, when executed by a computer processor, cause the computer processor to carry out a method of synthesizing sensor data. The method includes obtaining a plurality of sensor readings from a corresponding plurality of sensors, the plurality of sensors arranged in a first predetermined pattern, wherein the first predetermined pattern maps each of the plurality of sensors to respective locations on the wearable device; based on the plurality of sensor readings and a plurality of estimation weights, estimating a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the wearable device; and outputting the plurality of sensor readings and the plurality of synthesized sensor readings.

The non-transitory computer readable medium can store computer-executable instructions, which, when executed by a computer processor, cause the computer processor to carry out the method of synthesizing sensor data, where the method is described herein.

According to some aspects, there is provided a method for synthesizing sensor data. The method includes obtaining a plurality of sensor readings from a corresponding plurality of sensors, the plurality of sensors arranged in a first predetermined pattern, wherein the first predetermined pattern maps each of the plurality of sensors to respective locations on a device; based on the plurality of sensor readings and a plurality of estimation weights, estimating a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the device; and outputting the plurality of sensor readings and the plurality of synthesized sensor readings.

The plurality of sensors can be pressure sensors.

The device can be a wearable device or fitness equipment. The fitness equipment can be a bicycle seat. The fitness equipment can be an exercise mat, a fitness bench, an exercise bar, or a treadmill.

The method can include computing at least one pressure derivative value based on the plurality of sensor readings and the plurality of synthesized sensor readings.

The at least one pressure derivative value can be a ground reaction force.

The at least one pressure derivative value can be a center of pressure.

A plurality of inertial measurement unit sensor readings can be used to compute the at least one pressure derivative value, The at least one pressure derivative value can be an energy expenditure or a rate of energy expenditure.

The method can include outputting an output dataset, which can include the plurality of synthesized sensor readings and/or the at least one pressure derivative value.

The output dataset can further include the plurality of sensor readings.

The output dataset can be used as an input to a game.

The output dataset can be used to execute an action in the game.

A scaling factor can be applied to the output dataset in the game.

The scaling factor can be an integer.

The scaling factor can have a value of 1.

An avatar can be generated in the game with motion defined according to the output dataset.

The output dataset can be used to model the dynamics of virtual objects and surroundings with which a user interacts in the game.

A game score can be calculated based on the output dataset in the game.

A training goal can be generated based on the output dataset and/or the game score.

A percentage of progress towards achieving the training goal can be calculated based on the output dataset and/or the game score.

A technique quality can be calculated from the output dataset.

A task readiness score can be calculated based on the output dataset and/or the technique quality.

A first user can be challenged to replicate the output dataset of a second user in the game.

The plurality of estimation weights can be predetermined in a preprocessing phase, and the preprocessing phase can include: obtaining training data, the training data including a plurality of sets of physical sensor readings from physical sensors arranged according to both the first and second predetermined patterns; filtering the training data to obtain filtered training data; using the filtered training data, computing an average sensor reading for each physical sensor to produce an input data set and a reference data set, the input data set including average sensor readings for sensors corresponding to the first predetermined pattern, the reference data set including average sensor readings for sensors corresponding to the second predetermined pattern; and optimizing the estimation weights.

Optimizing the estimation weights can include: initially estimating the estimation weights; computing estimated sensor values based on the input data set and the estimation weights; and performing gradient descent optimization to update the estimation weights, where the gradient descent optimization compares error between the estimated sensor values and the reference data set.

Filtering the training data can include resizing each instance of the training data to a common size.

Filtering the training data can include: dividing the training data into stance data and swing data; and resizing each instance in the set of stance data to a common size.

The plurality of sensor readings can be associated with an activity, and the plurality of synthesized sensor readings can be estimated when the activity is an activity requiring more sensors than can be provided by the plurality of sensors in the first predetermined pattern.

The activity can be running, jogging, walking, or cycling.

The method can include predetermining and optimizing estimation weights associated with a specific activity.

The wearable device or fitness equipment can include an inertial measurement unit.

The wearable device or fitness equipment can include vibrotactile motors.

The vibrotactile motors can generate a haptic signal based on the output dataset.

An audio signal can be generated based on the output dataset.

A visual display can be generated based on the output dataset.

The visual display can be a foot pressure map.

The first predetermined pattern can include at least 32 locations.

The first predetermined pattern can include sensors arranged in a 2-3-4-4-4-3 arrangement in a forefoot portion.

The first predetermined pattern can include sensors arranged in a 1-1-1 arrangement in a midfoot portion.

The first predetermined pattern can include sensors arranged in a 2-1-2-1-2-1 arrangement in a heel portion.

The second predetermined pattern can include at least 32 locations. The second predetermined pattern can include at least 68 locations.

A system for synthesizing sensor data in a device, the system comprising: a plurality of sensors arranged in a first predetermined pattern, with each of the plurality of sensors arranged at respective locations on the device; and one or more controllers communicatively coupled to the plurality of sensors, the one or more controllers configured to: obtain a corresponding plurality of sensor readings from the plurality of sensors; based on the plurality of sensor readings and a plurality of estimation weights, estimate a plurality of synthesized sensor readings for a corresponding plurality of synthesized sensors, the plurality of synthesized sensors arranged in a second predetermined pattern, wherein the second predetermined pattern maps each of the plurality of synthesized sensors to respective locations on the device; and output the plurality of sensor readings and the plurality of synthesized sensor readings.

The device can be a wearable device or fitness equipment. The fitness equipment can be a bicycle seat. The fitness equipment can be an exercise mat, a fitness bench, an exercise bar, or a treadmill.

The one or more controllers can be further configured to carry out a method for synthesizing sensor data, where the method is described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
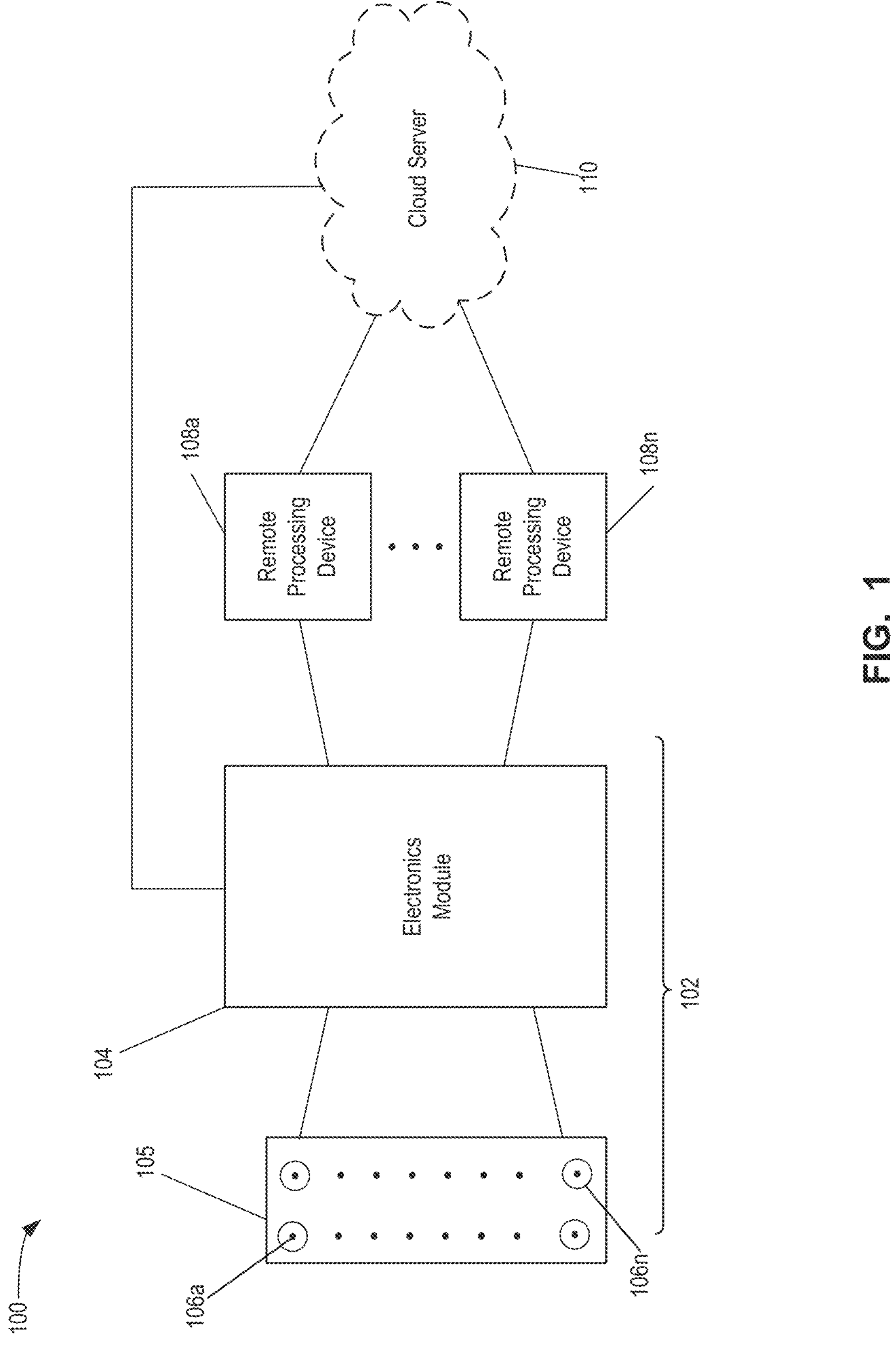
FIG. 1 is a block diagram illustrating an example of a system for synthesizing sensor data.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. Furthermore, the wording "at least one of A and B" is intended to mean only A (i.e. one or multiple of A), only B (i.e. one or multiple of B), or a combination of one or more of A and one or more of B.

Terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and devices for synthesizing sensor data for a wearable device or fitness equipment. The systems, methods, and devices can use sensors attached to, or contained within, wearable devices or fitness equipment to measure and monitor data relating to movement or activity of a user.

The sensors can be pressure sensors and can be provided in the insole of a shoe worn by the user. The pressure data acquired by the pressure sensors can be used to determine the level of pressure applied by a user's foot when walking, running, jumping, or gaming, for example. This pressure data can be used to derive additional pressure derivatives or pressure-based metrics, such as the force output or the center of pressure for the user. The pressure data, and other data derived therefrom, can be used for tracking and monitoring various parameters that may be useful for medical, fitness, athletic, security, gaming, entertainment or other purposes.

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object oriented programming. Accordingly, the program code may be written in any suitable programming language such as Python or C for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The present disclosure relates to a system, method, and computer program product that can be used to synthesize sensor data based on sensor readings from a plurality of sensors. The plurality of sensors can be positioned in a predetermined arrangement. The sensors can be discrete sensors such that the predetermined arrangement includes void locations where no sensors are located. The void locations can include interstitial locations between the sensors as well as external locations beyond the set of sensors. The subject matter described herein may be used to minimize error in synthesized sensor data at the interstitial locations between the discrete sensors when measuring human activity (such as human movement). The subject matter described herein may also be used to minimize error in synthesized sensor data at external void locations outside of a set of discrete sensors when measuring human activity.

Using a set of discrete sensors, as opposed to a dense continuous sensor array, can significantly reduce the cost of integrating sensing capabilities into a wearable device or piece of fitness equipment. When evaluating sensor data from a set of discrete sensors, interpolation techniques may be applied to estimate the sensed data at locations between the discrete sensors. However, traditional interpolation techniques between discrete sensors produce low accuracy estimates. As will be described in further detail herein below, the subject matter described herein may substantially increase the accuracy of sensor data estimates at locations between discrete sensors.

Similarly, extrapolation techniques may be applied to estimate the sensed data at locations external to the arrangement of discrete sensors. However, traditional extrapolation techniques for locations external to the arrangement of discrete sensors also tend to produce low accuracy estimates. As will be described in further detail herein below, the subject matter described herein may substantially increase the accuracy of sensor data estimates at locations external to an arrangement of discrete sensors.

In some examples, a plurality of sensors can be arranged in a first predetermined pattern that is mapped to respective locations on a wearable device or fitness equipment. A plurality of sensor readings can be received from the plurality of sensors.

Based on the plurality of sensor readings and a plurality of estimation weights, a plurality of synthesized sensor readings can be estimated for a corresponding plurality of synthesized sensors. The plurality of synthesized sensors can be arranged in a second predetermined pattern that maps each of the synthesized sensors to respective locations on the wearable device or fitness equipment.

The synthesized sensors may be mapped to locations where actual sensors are not present (i.e. void locations where there are no actual sensors on a wearable device or fitness equipment). The synthesized sensor readings can thus provide estimated sensor readings for locations between the plurality of sensors in the first predetermined pattern (i.e. interstitial locations where there are no actual sensors on a wearable device or fitness equipment). The synthesized sensor readings can also provide estimated sensor readings for locations external to the plurality of sensors in the first predetermined pattern (i.e. external void locations where there are no actual sensors on a wearable device or fitness equipment).

The plurality of sensor readings and the plurality of synthesized sensor readings can then be output. The output data can be used for various purposes, such as providing a user with feedback on the sensor readings and/or for further analysis to determine derived sensor data. The output data and/or the derived sensor data can additionally be used as an input to a game.

The estimation weights may be determined using training data from one or more users. The estimation weights may then be applied to determine synthesized sensor readings for a sensor unit that is used by the same or different users.

Various sets of estimation weights may be determined. For example, different sets of estimation weights may be determined for different configurations (e.g. shape, size, and sensor layout) of sensor unit. The different sets of estimation weights may allow synthesized sensor readings to be determined for sensor units of different shapes or sizes. In some cases, a different set of estimation weights may be determined for each sensor unit configuration (i.e. size, shape and sensor layout) for which synthesized sensor readings are to be determined. The particular estimation weights used to generate the synthesized sensor readings may be determined based on the configuration of the corresponding sensor unit.

Different sets of estimation weights may be determined using the same set of training data acquired from one or more training sensor units. Training data acquired from sensor units having a certain configuration or configurations may be used to determine estimation weights for sensor units having a different configuration. For example, the training data may be normalized to correspond to the configuration size of the sensor array for which the estimation weights are being determined.

The estimation weights used to determine the synthesized sensor readings can be optimized during a preprocessing phase. Optimizing the estimation weights can help minimize the error between the estimated sensor readings (at locations between discrete sensors and/or locations external to the set of discrete sensors) and actual sensor readings that would be acquired at the same locations (e.g. using a dense sensor array) when measuring human movement and human activity.

The preprocessing phase can reduce the computational expense required to determine the synthesized sensor readings when measuring human movement and human activity. In particular, optimizing the plurality of estimation weights during the preprocessing phase allows the estimation weights to be generated and stored prior to active data collection. Accordingly, when sensor readings are acquired, the predetermined estimation weights can be used to easily and rapidly calculate real-time synthesized pressure data.

In some cases, the preprocessing phase may also be defined to reduce the computational expense required to optimize the estimation weights. In particular, filtering and averaging data can simplify the computation required to determine the estimation weights.

The use of discrete sensors (also referred to as a sparse sensor array), as opposed to a more densely populated sensor array (referred to herein as a dense sensor array or continuous sensor array), can also reduce the volume of data that must be stored, managed and analyzed.

Referring now to FIG. 1, shown therein is a block diagram illustrating an example system 100 that can be used to synthesize sensor data from a wearable device or fitness equipment. System 100 includes an input unit 102 (also referred to herein as an input device), one or more processing devices 108 (also referred to herein as a receiving device or an output device) and optionally a remote cloud server 110. As will be described in further detail below, the input unit 102 may for example be combined with, or integrated into, a carrier unit such as a wearable device or a piece of fitness equipment.

Input unit 102 generally includes a sensing unit 105. The sensing unit 105 can include a plurality of sensors 106*a*-106*n*. The plurality of sensors 106*a*-106*n* can be arranged in a first predetermined pattern that maps each sensor 106 to a corresponding location of the carrier unit.

The carrier unit can be configured to hold the sensors 106 in contact with (or close proximity to) a user's body to allow the sensors 106 to measure an aspect of the activity being performed by the user. The plurality of sensors 106*a*-106*n* may be configured to measure a particular sensed variable at a location of a user's body when the carrier unit is engaged with the user's body (e.g. when the user is wearing a wearable device containing the sensors 106 or when the user is using fitness equipment containing the sensors 106).

In some examples, the carrier unit may include one or more wearable devices. The wearable devices can be manufactured of various materials such as fabric, cloth, polymer, or foam materials suitable for being worn close to, or in contact with, a user's skin. All or a portion of the wearable device may be made of breathable materials to increase comfort while a user is performing an activity.

In some examples, the wearable device may be formed into a garment or form of apparel such as a band, headwear, a shirt, shorts, a sock, a shoe, a sleeve, and a glove (e.g. a tactile glove). Some wearable devices such as socks or sleeves may be in direct contact with a user's skin. Some wearable devices, such as shoes, may not be in direct contact with a user's skin but still positioned within sufficient proximity to a user's body to allow the sensors to acquire the desired readings.

In some cases, the wearable device may be a compression-fit garment. The compression-fit garment may be manufactured from a material that is compressive. A compression-fit garment may minimize the impact from "motion artifacts" by reducing the relative movement of the wearable device with respect to a target location on the user's body. In some cases, the wearable device may also include anti-slip components on the skin-facing surface. For example, a silicone grip may be provided on the skin-facing surface of the wearable device to further reduce the potential for motion artifacts.

In some examples, the wearable device may be worn on a foot. For example, the wearable device may be a shoe, a sock, an insole or a portion of a shoe, a sock, or an insole. The wearable device may include a deformable material, such as foam. This may be particularly useful where the wearable device is worn underfoot, as in a shoe or insole.

The plurality of sensors 106*a*-106*n* can be positioned to acquire sensor reading from specified locations on a user's body (via the arrangement of the sensors on the carrier unit). The sensors 106 can be integrated into the material of the carrier unit (e.g. integrated into a wearable device or fitness equipment). Alternatively, the sensors 106 can be affixed or attached to the carrier unit, e.g. printed, glued, laminated or ironed onto a surface, or between layers, of a wearable device or fitness equipment.

In some examples, the carrier unit may include fitness equipment. The fitness equipment may include various types of fitness equipment on which a user can exert pressure while performing an activity. For example, the carrier unit may be fitness equipment such as an exercise mat, a fitness bench, a bar (e.g. a squat rack or a pull-up bar), a treadmill, or a bicycle seat for a bicycle or stationary bicycle.

For clarity, the below description relates to a carrier unit in the form of an insole. The insole carrier unit may be provided in various forms, such as an insert for footwear or integrated into a shoe. However, other carrier units may be implemented using the systems and methods described herein, such as the wearable devices and fitness equipment described above.

The below description relates to an insole in which the plurality of sensors 106 are pressure sensors. However, alternative types of sensors, for which discrete sensor configurations and dense array sensor configurations exist, may be used. Such sensors may include, for example, optical sensors, temperatures sensors, or electromagnetic sensors.

In addition, various types of pressure sensors may be used, such as force sensing resistors (also referred to as "sensels" or sensing elements), piezoelectric tactile sensors, elasto-resistive sensors, capacitive sensors or more generally any type of pressure sensor for which discrete and dense array sensor configurations exist.

Optionally, the system described herein can also include one or more inertial measurement units (IMUs). Each IMU can be associated with a corresponding plurality of pressure sensors. That is, each IMU can be configured to collect inertial measurement data relating to movement of the same foot under which the pressure sensors are positioned.

Optionally, the system described herein can also include one or more temperature sensors and/or a GPS system.

Figure 2A:
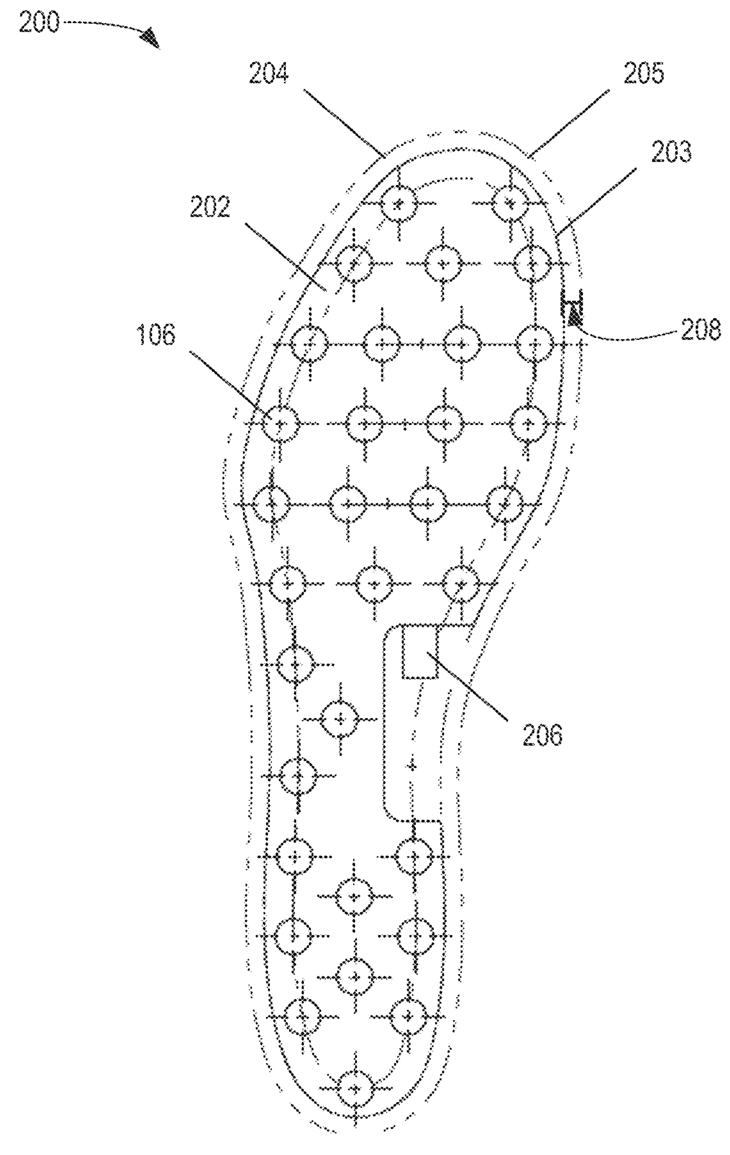
FIG. 2A is a diagram illustrating an example of a wearable device incorporating a sensing unit that can be used in the system of FIG. 1.
Figure 2B:
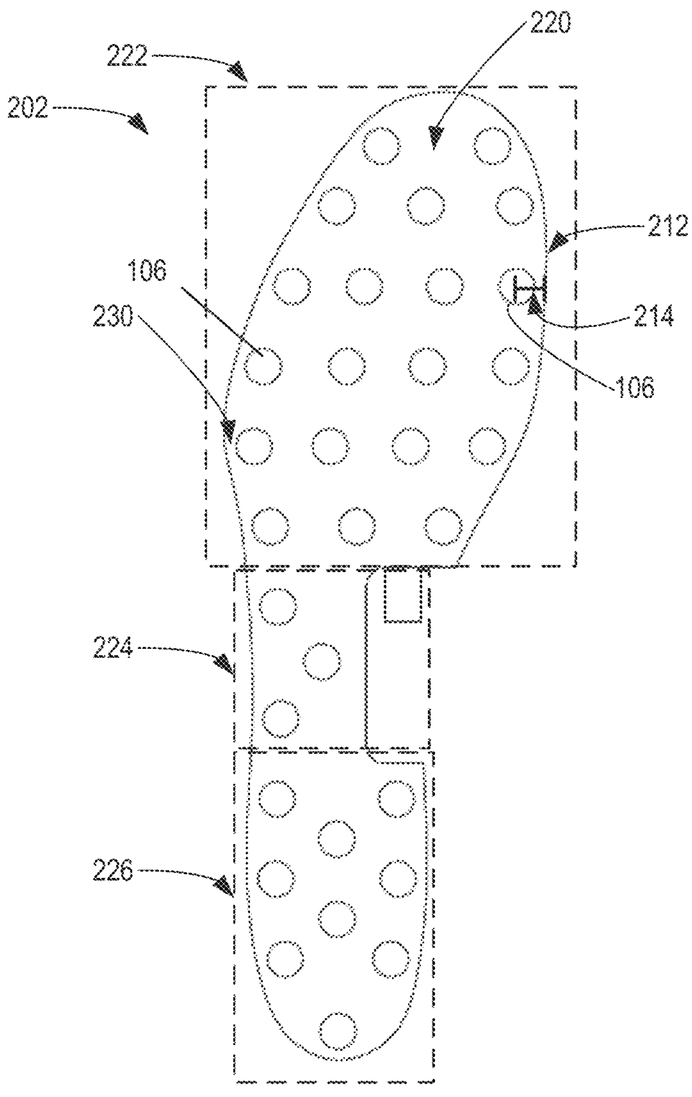
FIG. 2B is a diagram illustrating an example of a sensing unit that can be used with the wearable device of FIG. 2A.

The plurality of sensors 106 can be provided as a set of discrete sensors (see e.g. FIG. 2B). A discrete sensor is an individual sensor that acquires a sensor reading at a single location. A set of discrete sensors generally refers to multiple discrete sensors that are arranged in a spaced apart relationship in a sensing unit. The spaced apart relationship can define void locations where no sensors are located. The spaced apart relationship includes void locations in the form of gaps between the individual discrete sensors 106 (referred to herein as interstitial locations 220). No actual sensors are located in these interstitial locations 220. Similarly, the void locations can include locations (see locations 230 shown in FIG. 2B) external to the set of discrete sensors where synthesized sensor readings may be desired.

The sensors 106*a*-106*n* may be arranged in a sparse sensor array that includes void locations where no sensors 106 are located. A sensor array (as used herein) refers to a series of sensors arranged in a defined grid. In a continuous or dense sensor array, in contrast to a set of discrete sensors that may provide a sparse sensor array, the sensors within the dense sensor array are arranged in a continuous, or substantially continuous manner, across the grid. That is, a dense sensor array is considered to be capable of acquiring actual sensor readings at all locations of the sensor grid. Thus, the dense sensor array does not typically need to estimate sensor values at interstitial locations or locations external to the array. The dense sensor array provides a comprehensive understanding of sensed values throughout the locations engaged by the corresponding grid.

Discrete sensors can provide an inexpensive alternative to dense sensor arrays for many applications. However, because no sensors are positioned in the interstitial locations 220 between the discrete sensors, no actual sensors readings can be acquired for the interstitial locations 220. Similarly, because no sensors are positioned in the void locations 230 external to the set of discrete sensors, no actual sensors readings can be acquired for the external void locations 230. In order to provide sensor data with similar resolution to a dense sensor array, sensor readings must be estimated (rather than measured) at the interstitial locations 220 and at the void locations 230 external to the set of discrete sensors.

Interpolation has been used to estimate the sensor values at the interstitial locations 220. Extrapolation has also been used to estimate the sensor values at the void locations 230 external to the set of discrete sensors. However, traditional interpolation and extrapolation often produce low accuracy estimates as compared to actual measurements taken at the corresponding locations with a dense sensor array.

System 100 can be configured to implement a method of synthesizing sensor data that increases the accuracy of estimated sensor readings between discrete sensors (i.e. at interstitial locations 220) and external to the set of discrete sensors (i.e. at external void locations). The method of synthesizing sensor data may be implemented using a controller of the input device 102, a remote processing device 108, or cloud server 110.

As shown in FIG. 1, input unit 102 includes an electronics module 104 coupled to the plurality of sensors 106. In some cases, the electronics module 104 can include a power supply, a controller, a memory, a signal acquisition unit operatively coupled to the controller and to the plurality of sensors 106, and a wireless communication module operatively coupled to the controller.

Generally, the sensing unit refers to the plurality of sensors 106 and the signal acquisition unit. The signal acquisition unit may provide initial analog processing of signals acquired using the sensors 106, such as amplification. The signal acquisition unit may also include an analog-to-digital converter to convert the acquired signals from the continuous time domain to a discrete time domain. The analog-to-digital converter may then provide the digitized data to the controller for further analysis or for communication to a remote processing device 108 or remote cloud server 110 for further analysis.

Optionally, the electronics module 104 may include a controller configured to perform the signal processing and analysis. In such cases, the controller on the electronics module may be configured to process the received sensor readings in order to determine synthesized sensor readings. In some cases, the controller may be coupled to the communication module (and thereby the sensing unit) using a wired connection such as Universal Serial Bus (USB) or other port.

The electronics module 104 can be communicatively coupled to one or more remote processing devices 108*a*-108*n*, e.g. using a wireless communication module (e.g., Bluetooth, Bluetooth Low-Energy, WiFi, ANT+IEEE 802.11, etc.). The remote processing devices 108 can be any type of processing device such as a personal computer, a tablet, and a mobile device such as a smartphone, a smartwatch or a wristband for example. The electronics modules 104 can also be communicatively coupled to a remote cloud server 110 over, for example, a wide area network such as the Internet.

Each remote processing device 108 and optional remote cloud server 110 typically includes a processing unit, an output device (such as a display, speaker, or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit and a memory unit. The memory unit can include RAM, ROM, one or more hard drives, one or more flash drives or some other suitable data storage elements such as disk drives, etc.

The processing unit controls the operation of the remote processing device 108 or the remote cloud server 110 and can be any suitable processor, controller or digital signal processor that can provide sufficient processing power depending on the desired configuration, purposes, and requirements of the system 100.

The display can be any suitable display that provides visual information. For instance, the display can be a cathode ray tube, a flat-screen monitor and the like if the remote processing device 108 or remote cloud server 110 is a desktop computer. In other cases, the display can be a display suitable for a laptop, tablet or handheld device such as an LCD-based display and the like.

System 100 can generally be used for synthesizing sensors readings based on sensor readings received from a plurality of sensors. In some cases, system 100 may also track additional data derived from the synthesized sensor readings. The sensor readings, synthesized sensor readings, and derived data may be monitored, stored, and analyzed for the user. Aspects of the monitoring, storage and analysis of biometric features and other metrics may be performed by one or more of the input unit 102, and/or a remote processing device 108, and/or the cloud server 110.

A remote cloud server 110 may provide additional processing resources not available on the input unit 102 or the remote processing device 108. For example, some aspects of processing the sensor readings acquired by the sensors 106 may be delegated to the cloud server 110 to conserve power resources on the input unit 102 or remote processing device 108. In some cases, the cloud server 100, input unit 102 and remote processing device 108 may communicate in real-time to provide timely feedback to a user regarding the sensor readings, synthesized sensor readings and data derived therefrom.

Referring now to FIG. 2A, shown therein is an example of an insole 200 that includes a sensing unit 202. The insole 200 is an example of an input device 102 that may be used in the system 100 shown in FIG. 1. The insole 200 may be used to provide a plurality of pressure sensors for a footwear insert, such as the insert described in PCT Application No. PCT/CA2020/051520 published on May 20, 2021, which is incorporated herein by reference. The insole 200 may be an Orpyx SI® Sensory Insole sold by Orpyx Medical Technologies Inc.

The insole 200 includes a sensor unit 202 and an optional liner 204. The liner 204 can provide a protective surface between the sensor unit 202 and a user's foot. The liner 204 may have a slightly larger profile as compared to the sensor unit 202. That is, the outer perimeter 203 of the sensor unit 202 may be inwardly spaced from the outer perimeter 205 of the liner 204 by an offset 208. The offset 208 may be substantially consistent throughout the perimeter of the sensor unit 202 such that the sensor unit 202 is completed covered by the liner 204.

The sensor unit 202 can also include a connector 206. The connector 206 may provide a coupling interface between the plurality of sensors 106 and an electronics module (not shown) such as electronics module 104. The coupling interface can allow signals from the sensors 106 to be transmitted to the electronics module. In some cases, the coupling interface may also provide control or sampling signals from the electronics module to the sensors 106.

FIG. 2B illustrates the sensor unit 202 with the liner 204 omitted. Sensor unit 202 is an example of a sensor unit that may be used as sensing unit 105 in system 100. As illustrated, the plurality of sensors 106 are arranged in a predetermined pattern (also referred to as a sensor layout or predetermined sensor layout) where the sensors 106 are spaced apart from one another, The sensors 106 provide a set of discrete sensors that are distributed across the sensor unit 202.

In this layout, there are void locations where no actual sensor readings can be acquired. The void locations can include interstitial locations 220 between the sensors 106 where no actual sensor readings can be acquired. The void locations can also include external void locations 230 outside of the sensors 106 where no actual sensor readings can be acquired.

The predetermined pattern of sensors 106 can include at least 32 locations. As illustrated in the example of FIG. 2B, the predetermined pattern of sensors 106 in sensor unit 202 includes exactly 32 locations.

The pattern of the plurality of sensors 106 shown in FIG. 2B is an optimized sensor pattern that can be used to synthesize sensor readings at interstitial locations 220 and external void locations 230 with improved accuracy (as discussed further herein below with reference to FIGS. 9A-9D).

The arrangement of sensors 106 in the insole 202 can be separated into distinct regions or portions. As shown in FIG. 2B, in the example shown, the sensors 106 are separated into a forefoot portion 222, a midfoot portion 224, and a heel portion 226. The pattern of the sensors 106 within each portion (i.e. forefoot 222, midfoot 224 and heel 226) can be tailored based on the type and location of foot contact that is expected.

As illustrated, the sensor pattern includes sensors 106 arranged in a 2-3-4-4-4-3 arrangement in the forefoot portion 222. This forefoot sensor pattern may be particularly advantageous in acquiring sensor readings from the front part of a user's foot, and the toe region in particular.

As illustrated, the sensor pattern includes sensors 106 arranged in a 1-1-1 arrangement in a midfoot portion 224. This midfoot sensor pattern may be particularly advantageous in acquiring sensor readings from the arch region of a user's foot while also minimizing the total number of sensors required.

As illustrated, the sensor pattern includes sensors 106 arranged in a 2-1-2-1-2-1 arrangement in a heel portion 226. This sensor pattern may be particularly advantageous in acquiring sensor readings from the back part of a user's foot, and the heel region in particular.

Figure 3:
FIG. 3 is a flowchart illustrating an example of a method for synthesizing sensor data.
Figure 3:
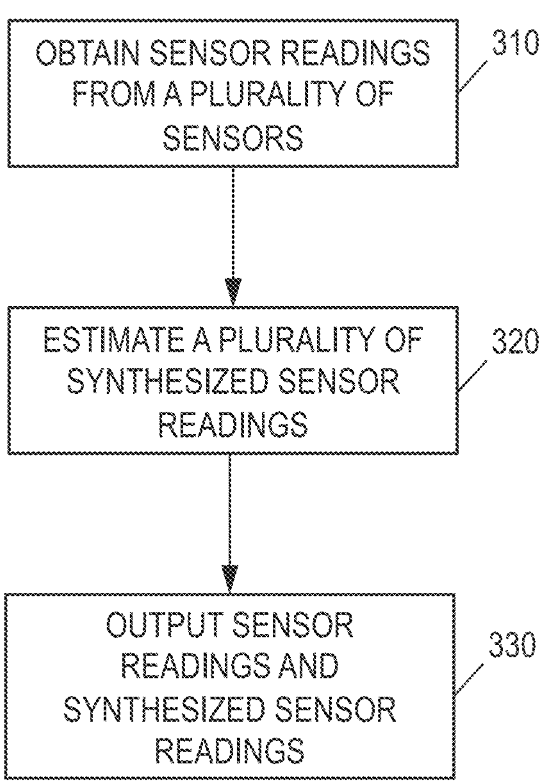

Referring now to FIG. 3, shown therein is an example method 300 for synthesizing sensor data for a carrier unit such as a wearable device or fitness equipment. The method 300 may be used with a plurality of sensors configured to measure human movement or human activity, such as sensors 106 for example. Method 300 is an example of a method for synthesizing sensor data in which estimation weights are defined so as to increase the accuracy of the synthesized sensor readings.

At 310, a plurality of sensor readings can be obtained from a corresponding plurality of sensors. The sensors can be positioned at specified locations on a carrier unit such as a wearable device or a piece of fitness equipment.

Figure 8B:
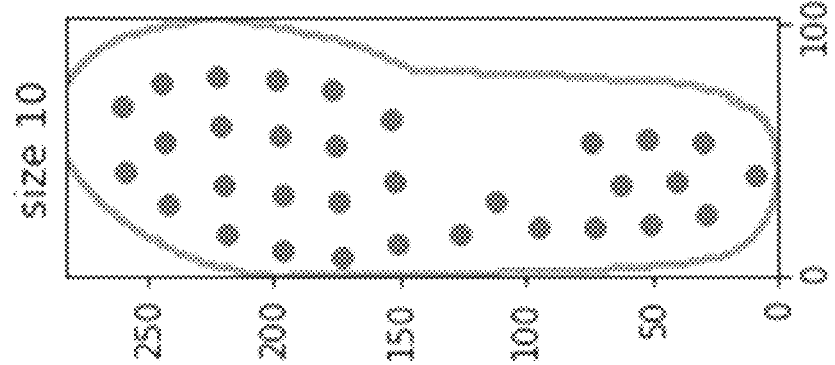
FIG. 8B is a diagram illustrating another example sensor pattern for a wearable device in accordance with an embodiment.
Figure 8A:
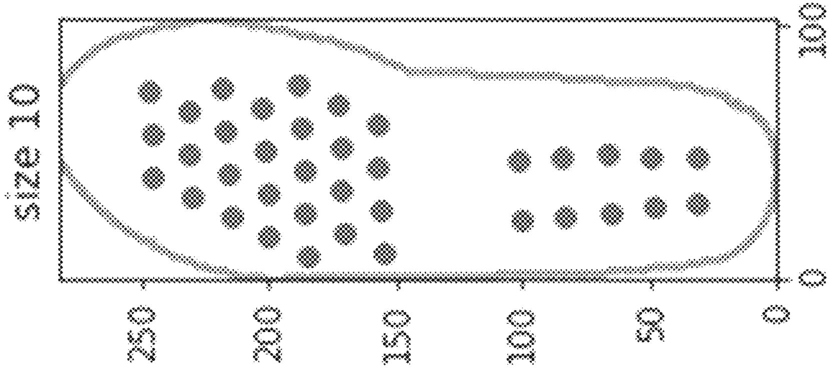
FIG. 8A is a diagram illustrating an example sensor pattern for a wearable device in accordance with an embodiment.

The plurality of sensors can be arranged in a first predetermined pattern, such as the patterns shown in FIG. 2B or FIG. 8A. The first predetermined pattern can map each of the plurality of sensors to respective locations on the carrier unit. Accordingly, when the carrier unit is engaged with a user's body, the sensors can be mapped to respective locations on the user's body.

The first predetermined pattern can include different numbers of sensor locations depending on the type of carrier unit and/or the type of sensor. For example, the first predetermined pattern can include at least 32 locations. At least 32 sensor locations may be particularly desirable where the sensor unit is arranged to acquire data from under a user's foot in order to allow the synthesized sensor readings to be estimated accurately.

The sensors can be configured to measure data relating to human activity. As shown in FIGS. 2A-2B, the plurality of sensors may be pressure sensors mapped to specific locations of an insole. The pressure sensors can measure pressure applied to the insole during physical activities, such as walking, running, jumping, or gaming, for example.

At 320, the controller can determine a plurality of synthesized sensor readings for a corresponding plurality of synthesized sensors. The plurality of synthesized sensor readings can be estimated based on the plurality of sensor readings from 310 and a plurality of estimation weights.

The plurality of synthesized sensors can be arranged in a second predetermined pattern. The second predetermined pattern can map each of the plurality of synthesized sensors to respective locations on the carrier unit. Accordingly, when the carrier unit is engaged with a user's body, the synthesized sensors can be mapped to respective locations on the user's body.

The second predetermined pattern can include different numbers of sensor locations depending on the type of carrier unit, the type of sensor and/or the number and arrangement of sensor locations in the first predetermined pattern.

The second predetermined pattern can include the same number of locations as the first predetermined pattern. For example, the second predetermined pattern may include at least 32 locations.

The second predetermined pattern may include a greater number of locations than the first predetermined pattern. For example, the second predetermined pattern may include at least 68 locations.

The plurality of sensor readings received at 310 can be received from discrete sensors arranged at specified locations on a carrier unit according to the first predetermined pattern. The plurality of synthesized sensors can include synthesized sensors arranged at estimation locations where no discrete sensors are located according to the second predetermined pattern. The synthesized sensor readings can thus reflect an estimate of what an actual sensor would have measured had an actual sensor been positioned at the location of a given synthesized sensor.

The estimation locations can include interstitial locations between the discrete sensors. The estimation locations can also include external void locations at locations external to the set of discrete sensors.

The set of sensor locations in the second predetermined location can be different from the set of sensor locations in the first predetermined location. In some examples, the set of sensor locations in the second predetermined location can be mutually exclusive of the set of sensor locations in the first predetermined location. Accordingly, each of the synthesized sensor readings may reflect estimated sensor readings at locations where there are no actual sensors.

Figure 4:
FIG. 4 is a flowchart illustrating an example of a method for determining estimation weights that may be used with the method shown in FIG. 3.
Figure 4:
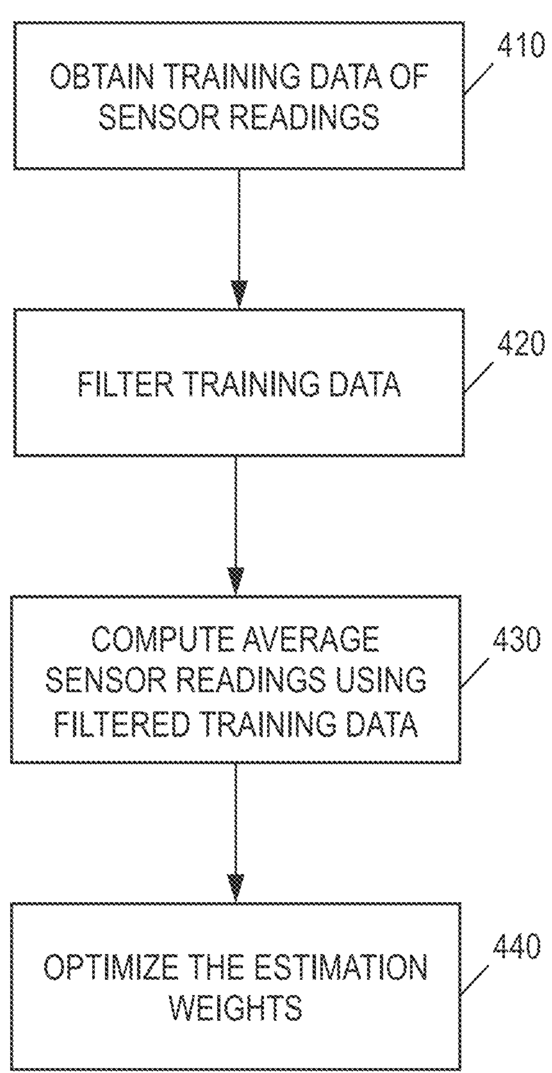

The plurality of estimation weights may be predetermined in a preprocessing phase. The preprocessing phase can be defined to optimize the estimation weights to minimize the error between the synthesized sensor readings and the readings that would have been acquired from an actual sensor positioned at the same location. An example method for determining the plurality of estimation weights during a preprocessing phase is shown in FIG. 4 and described in further detail herein below.

At 330, the controller can output the plurality of sensor readings and the plurality of synthesized sensor readings. This may provide a comprehensive set of sensor readings (real and estimated) across an area of a user's body that is being measured or monitored. This set of sensor readings can be output directly through an output device to provide a user with feedback on the activity being monitored. Alternately or in addition, the sensor readings may be stored, e.g. for later review, comparison, analysis, or monitoring. The output data may additionally be used as an input to a game.

Optionally, an activity may be associated with the plurality of sensor readings, and the synthesized sensor readings may only be determined and outputted if the activity is one that requires high granularity (i.e. higher granularity than can be provided by the number of sensors on the carrier unit). In other words, steps 320 and 330 of method 300 can be disabled. Synthesizing sensor readings increases the granularity of sensor data, as well as the accuracy of derivatives calculated from the data. Highly granular pressure data may be beneficial in certain scenarios, such as for athletic training and athletic gaming, where large quantities of data can provide deeper insights into athletic performance and biomechanics. For example, highly granular sensor data may be desirable for activities such as running, jogging, walking, and cycling. However, a high level of granularity may not be required in other scenarios, such as for other types of gaming, where sufficient granularity may be obtained from the sensor readings, without the need to synthesize additional sensor data.

The activity associated with the plurality of sensor readings can be identified in a few ways. The activity may be selected on the remote processing device 108 or cloud server 110. For example, a user wearing the carrier unit may select the activity (e.g. going for a run vs. a cooking game) in a mobile application associated with the remote processing device. Alternatively, an activity classification algorithm can be used to determine the activity associated with the plurality of sensor readings. An example of an activity classification method that may be used to classify the sensor data is described in US Patent Publication No. 2020/0218974 entitled "METHOD AND SYSTEM FOR ACTIVITY CLASSIFICATION", which is incorporated herein by reference.

Alternatively, steps 320 and 330 of method 300 may be enabled or disabled independent of the activity associated with the plurality of sensor readings (i.e. a user can toggle these steps "on" or "off" as desired).

As another alternative, it may be possible to enable or disable steps 320 and 330 of method 300 for select synthesized sensors in the second predetermined pattern (i.e. certain synthesized sensors may be turned "on" or "off"). For example, if the second predetermined pattern includes 68 synthesized sensors, which provides more granularity than a user desires, the user may disable 34 of the synthesized sensors to reduce the granularity of the data by half (however, the granularity would still be higher than if no synthesized sensor data were generated).

Other hardware and software features of the system may also be enabled, disabled, or modified. For example, a user may enable or disable certain sensors, which may be desirable if the user has a foot condition which inhibits them from activating certain sensors, such as a broken or missing toe. Sampling rate may also be modifiable. Sampling rate may be modified to minimize processing time and to save memory, or to increase data output to gain deeper insights. The location of processing (the input unit 102, the remote processing device 108, or the cloud server 110) may also be changed. If additional sensors are included in the wearable device (e.g. IMUs, temperature sensors, and/or GPS systems), certain sensor types may be enabled or disabled. For example, a GPS system can be disabled to conserve battery power of a carrier unit, if a user operates the carrier unit while riding a stationary bicycle at home.

Optionally, additional parameters or derived data values can be determined from the set of sensor readings (including the readings received at 310 and estimated at 320). These additional parameters may also be output to a user as feedback, to a storage device, or to an analysis device or applications.

As noted above, the sensors may be pressure sensors mapped to specific locations of an insole. Accordingly, at 330, the controller may output a pressure grid that includes both the actual pressure measurements from the discrete sensors and the estimated pressure estimates from the synthesized sensors. The pressure grid can identify the pressure applied at all locations of the insole, including locations that do not have an actual sensor.

The controller can use the plurality of sensor readings and the plurality of synthesized sensor readings to compute pressure derivative values or pressure-based metrics. For example, the controller may use the plurality of sensor readings and the plurality of synthesized sensor readings to compute a vertical ground reaction force (vGRF).

Alternately or in addition, the controller can use the plurality of sensor readings and the plurality of synthesized sensor readings to compute a center of pressure (COP).

Alternately or in addition, the controller can use the plurality of sensor readings and the plurality of synthesized sensor readings to compute one or more additional pressure derivative values such as a foot contact event, a vertical rate of force development, an impulse, a pressure map, a location of peak pressure, an asymmetry value, a COP velocity in two dimensions, a COP length in two dimensions, an anterior-posterior ground reaction force, and a medial-lateral ground reaction force for example.

Wherein the insoles include an inertial measurement unit (IMU), the controller can use the plurality of sensor readings, the plurality of synthesized sensor readings, and the IMU data to compute an energy expenditure and/or a rate of energy expenditure.

Pressure derivative values may be calculated from the sensor readings and synthesized sensor readings for each insole in a pair of insoles. Alternatively or in addition, pressure derivative values may be calculated from the sensor readings and synthesized readings of both insoles in a pair of insoles.

The plurality of sensor readings, the plurality of synthesized sensor readings, the pressure derivative values, or any combination of the aforementioned readings or values may be outputs (i.e. an output dataset) of the system.

The outputs may be used as inputs to a game. In one embodiment, the outputs may correspond to certain foot gestures, and foot gestures may be used to control the game (like buttons on a game controller). In particular, gestures performed in real life may be recreated in a game. For example, the outputs that correspond to a user walking forward in real life may cause an avatar to walk forward in a game. In another example, a user may balance on one foot and kick the ground in order to propel an avatar forward on a skateboard or hoverboard in a game. Alternatively, gestures may not be recreated in a game, but may be used to execute controls in a game. For example, a foot tap by a user in real life may serve to select an option in a game menu. The occurrence of a foot tap may be determined from the outputs, such as from a quick increase then decrease in the vertical ground reaction force, over a predetermined period of time.

In another embodiment, center of pressure (COP) location and velocity can be used to control a game, similarly to a joystick. The COP location and velocity can control navigation in a game. For example, an avatar in a game may move in the direction a user leans. If a user quickly shifts their weight to their toes, the avatar may quickly accelerate forward in the game. Alternatively, COP location and velocity may also be used to control objects in a game, such as a precision game. For example, in a game a user may be required to move a ball through a maze in a wooden box, using only their COP to manipulate the orientation of the wooden box.

Gestures and outputs and their corresponding actions may by pre-programmed into a game or may be programmed by users. For example, the game may have a preprogrammed heel tap gesture on the left foot that corresponds to an action in the game (e.g. selecting an option in a menu). However, in some cases, not all users are able to perform the heel tap gesture on the left foot (e.g. a user with no left foot). Instead, the user may be able to program their own foot gesture for the selection tool. The user may record another action (e.g. a heel tap on the right foot with a lower vertical ground reaction force (vGRF)) that replaces the preprogrammed gesture). In a further example, for a game that uses COP as a joystick, the preprogrammed COP may be calculated from all the sensors and synthesized sensors on both the left and right feet. A user missing a portion of their left foot may not have an accurate representation of COP using all sensors on both feet. Instead, the user may choose to reprogram the system, such that COP is calculated only from the sensors they regularly activate. Reprogramming the system will provide more accurate COPs for the user and will allow them to play the game to the same extent as other users.

Virtual environments, objects, and avatars may be generated, with which a user using the system can interact. The virtual environment and virtual objects can be altered based on the movements, gestures, and outputs of the user. Output devices (e.g. a television screen, a virtual reality headset, etc.) may be used to display the virtual environment to users. A user may visit a variety of virtual environments, including imaginary environments or environments that replicate real-life environments (e.g. Times Square, a friend's house, etc.). When a user moves around while wearing the carrier unit, they will move around in and interact with the virtual environment accordingly.

A scaling factor may be applied to outputs in a game. The scaling factor may be an integer (e.g. 1, 2, 5, 10, etc.) or it may not be an integer (e.g. 0.2, 1.5, 2.6, 6.9, etc.). In one example, the scaling factor may be 1. In this case, the outputs are applied equivalently in a game (i.e. a 1:1 scaling). For example, the vertical ground reaction force applied to the ground when an avatar stamps their foot in a game is equivalent to the vertical ground reaction force a user exerts on the ground in real life. In another example, the scaling factor may be 5. In this case, outputs are scaled 1:5 from real life to the game. The vertical ground reaction force applied to the ground when an avatar stamps their foot in a game would be five times the vertical ground reaction force that a user applies to the ground in real life. Gaming experiences that are directly based on a user's outputs allow users to have a more realistic and immersive gaming experience than games that are not based on a user's biometric data (e.g. games played with buttons on a controller). Output scaling may allow for superhuman performance enhancements in a game. For example, an avatar whose vertical ground reaction force is scaled by a scaling factor of 5 may be able to break through a glass floor when they stamp their foot in a game, but an avatar whose vertical ground reaction force is scaled by a scaling factor of 1 may not be able to break through it. Different scaling factors may also be applied to different outputs. For example, a scaling factor of 2 may be applied to the vertical ground reaction force, but a scaling factor of 0.5 may be applied to the center of pressure velocity.

The outputs may also be applied to different environmental factors in a game. For example, the gravity in a game can be changed. The gravity can be changed to that of another planet, such as the gravity of Mars. The outputs can be applied to the new environmental factors, so a user can understand how they might perform in a different environment. The performance of the user under the original conditions and the simulated conditions can be shown on a visual display.

The virtual environment can display or generate an avatar representing the portion of a user's body to which the carrier unit is affixed. For example, if the carrier unit is a pair of insoles, an avatar's feet corresponding to the user's feet may be rendered in the virtual environment. The skins and/or shoes applied to the feet in the virtual environment may depend on the outputs for the user. For example, if a user's outputs indicate that they are performing a leisurely task, they may be depicted wearing flip flops in the game environment. As another example, if the vertical ground reaction force (vGRF) of a user indicates that they are running, they may be depicted wearing sneakers in the game environment. Special objects and/or abilities may be associated with the virtual skins and shoes. For example, virtual lasers or swords may extend from the virtual shoes that can be used to fight villains in a game. As another example, virtual shoes may contain a special feature, where they can build up energy if a user performs a certain task, such as dancing, or reaches certain goals. The built-up energy can be used to create a burst of power to provide a competitive advantage in a fighting game.

Alternatively, the virtual environment can display or generate an avatar for the user's entire body. The appearance of the avatar's body may depend on the user's outputs. For example, if large vertical ground reaction forces are frequently recorded for a user, it may be inferred that they regularly perform high-intensity physical activities such as running, and their avatar may appear lean. An avatar's appearance may also be location dependent. For example, if a user lives in a warm, dry climate, the avatar may be depicted in shorts and a t-shirt, with dried sand on their skin. Alternatively, if a user lives in the Arctic, their avatar may be depicted in a parka and furry boots. There may be location-dependent virtual items that can be unlocked. For example, if a user travels to another country in real life, they may unlock a special running shoe from that country. The carrier unit may contain a GPS system or another location-sensing system to enable the location-dependent items and features to be unlocked.

The outputs may also be used to model the dynamics of virtual objects and/or surroundings within a game, with which a user interacts. For example, if an avatar jumps on a trampoline in a game, the deflection of the trampoline in the game and the jump height of the avatar will be affected by the vertical ground reaction force applied to the ground by a user jumping in real life. As another example, the force with which a user kicks their leg in real life may proportionally alter the trajectory of a ball within a virtual game.

Additionally, the outputs may be used to control a character in a lifestyle game. These games may require a user to virtually embody a certain lifestyle and complete tasks involved with the lifestyle. For example, a user may embody the lifestyle of an Olympic athlete in a game. The user will be required to train like an athlete, and the outputs can be used to determine if the user has successfully completed the training. They may also be required to complete other tasks relating to the lifestyle of an Olympic athlete, such as taking rest days, taking part in competitions, achieving sponsorships, going on press tours, going grocery shopping, etc.

The system may also contain safety features to prevent users from injuring themselves on their real life surroundings while gaming. Safety features may be especially important for gaming with virtual reality headsets, where vision is obstructed. One safety feature that may be included in the carrier unit is sensors and/or software that can detect potential or recent collisions of a user with surrounding objects. In response to a detected collision, the system may pause the game to check on the user using a pop-up window. For example, wherein the carrier unit is an insole, software for the Bluetooth system may detect if a user's pair of insoles is in close proximity to another user's pair of insoles. The system may alert the users that they are getting too close to each other and are at risk of a person-to-person collision. The system may also identify that a collision has occurred if a sudden, unexpected change in the user's outputs is detected. For example, if the user is playing a game wherein their center of pressure is fairly consistent, then suddenly their center of pressure moves across their entire foot and their plantar pressure drops to zero, the outputs may indicate that the user has lost their balance and has fallen over, or that they have tripped on an object in their surroundings. In a further example, the system may have a feature where users can measure out a safe playing area. The safe playing area is a real-world zone in which a user may safely participate in a game, without risk of collision with surrounding objects. Before a gaming session starts, a user may be asked to walk around the safe playing area, which is recorded in the system. While playing the game, the user may receive feedback and alerts on where they are within the safe playing area. The user's position in the safe playing area may be shown on a visual display on the output or processing device and/or they may receive auditory, visual, tactile alerts, or combinations thereof to indicate that they are getting close to or have gone past the edge of the safe playing area.

The system may be paired with other carrier devices in gaming scenarios. For example, the insoles may be paired with other wearable devices, such as wrist-worn IMUs. A gaming platform comprising multiple wearable game controllers at different locations on the body can encourage users to engage with a game using their full body, which may increase their workout and fitness during the game. The system may also be paired with fitness equipment. For example, the insoles can be paired with a treadmill for a running game. The incline of the treadmill can change in response to different virtual terrains (e.g. running up a virtual mountain), and the user's outputs, as determined from the insoles, can determine how they are performing in the game. Visual display carrier units, such as VR headsets, smart glasses, and smart goggles, may also be paired with the insoles to increase the immersivity of games.

The system may also contain additional sensor types, whose data can be used to augment gaming experiences. In particular, IMU data can supplement the pressure sensor data and provide additional insight into a user's biomechanics. For example, the IMU data can be used to recreate the motion of a user as an avatar in a virtual environment. In another example, IMU data can be used with the pressure sensor data to determine task readiness (i.e. how ready a user is to perform a gaming or an athletic activity). Temperature sensors may also provide various advantages for health and gaming applications. In particular, the system may include a temperature sensor used to measure body or environmental temperature. In a first example, one or more temperature sensors (e.g. thermistors) may be included in a flexible printed circuit within the bulk of the insole. The one or more temperature sensors can detect temperature changes from the body. The temperature changes may be used in an algorithm that adjusts other sensor (e.g. pressure sensor) readings to account for temperature drift. Alternatively, the one or more temperature sensors may be used to measure the body temperature of users for health and gaming calculations (e.g. calorie burn calculations or task readiness calculations). In another example, the one or more temperature sensors may be affixed to the outside of the shoe or at other locations away from a user's body to determine the external temperature. The external temperature may be used in gaming to send safety messages and notifications to users (e.g. if the external temperature is hot, a user may receive a notification suggesting they hydrate more frequently). The external temperature may also be used to adjust health and gaming calculations and may be used to adjust the virtual environment in a game (e.g. if the external temperature is hot, the game may place the user in a virtual desert).

Additionally, outputs may be used to monitor and evaluate a user's performance during an activity. For example, the outputs can contribute to scoring in a game. In one embodiment, the plurality of sensor readings, synthesized sensor readings, and inertial measurement unit (IMU) data can be used to determine energy expenditure, rate of energy expenditure, or combinations thereof (herein referred to as "energy expenditures values"). Energy expenditure is a measure of athletic intensity or effort of a user while performing an activity. Energy expenditure values may be converted into performance scores (e.g. a certain number of points) in a game. For example, the more energy a user expends, the greater number of points they will achieve in the game. Increased points earning may incentivize users to increase their physical activity during gaming. The outputs, energy expenditure values, and performance scores may be stored, e.g. for later review, comparison with other users, analysis, or monitoring.

The energy expenditure values and performance scores can be accumulated based on a user's participation in various activities providing a standardized way to incentivize or reward users for movement in non-gaming (e.g. athletic) and gaming activities.

One or more normalization factors may be defined to allow the outputs, performance scores, and/or energy expenditure values to be determined fairly for different users. Normalization factors may be applied to account for factors such as mass, weight, age, gender, natural athletic ability, game skill, other physical characteristics, or combinations thereof.

For example, wherein the carrier unit is an insole containing pressure sensors, energy expenditure values calculated from the outputs will be larger for heavier users than lighter users, as heavier users will naturally apply more force to the ground. However, normalization factors allow users of different sizes to obtain the same performance scores for performing equivalent activities.

The calculation of performance scores can also include modification factors such as multipliers and bonuses for successful completion of objectives including streaks, skillful movement combinations, and/or other unique game experiences such that performing the same in-game action may not yield the same performance scores each time.

Energy expenditure values, performance scores, and outputs may also be used as metrics for zone training. Zone training is a type of athletic training which encourages users to keep their metrics within a range or "zone" of values over a predetermined period of time (e.g. the length of a game). Users may be shown their position in a zone in real-time and may be rewarded for staying within the zone and/or penalized for leaving the zone. For example, a user may be given a rate of energy expenditure zone to stay within for a running game. During the game, the user will be encouraged to keep their rate of energy expenditure in the designated zone to achieve maximum points.

The outputs, energy expenditure values, and performance scores can also be used to determine other gaming-related metrics for users. For example, a user can be associated with one or more user levels. The user levels generally refer to the experience and/or power of a user within a game. User levels may be used to compare users to one another, or to establish progression in fitness and experience over time.

Energy expenditure values, performance scores, and outputs may also be used to assign and to track progress towards achieving training goals within a predetermined time. For example, based on a user's energy expenditure values over one week, a training goal can be generated for the user to achieve the same or greater energy expenditure values the subsequent week. Their energy expenditure values can then be tracked the subsequent week to determine the user's percentage of progress towards achieving the training goal.

Training goals can relate to accumulated energy expenditure values, performance scores, system usage metrics, and outputs that should be achieved in a predetermined time period (session, day, week, month, year, season, etc.) or instantaneous values (i.e. a rate) that should be achieved at a certain point in time. Training goals may be suggested by the processing system based on previous activities, be chosen by the user, or be presented as part of a challenge from another user or group of users. Suggested training goals can become increasingly targeted for users as additional sensor data is collected by the system over time.

Training goals can be directed toward weight loss. Wherein the carrier unit is an insole containing pressure sensors, body weight or mass can be measured by the insoles. Alternatively, an external device may be used to measure body weight or mass and transmit the values to the input device 102, remote processing device 108, or cloud server 110. If a user has a training goal to lose a certain amount of weight, the processing system may recommend certain activities to help them accomplish their goal. In particular, the processing system may recommend fitness-related games that can be played with the carrier unit. For example, for an overweight user, the system may suggest low impact, high calorie burning games. The system may create a fitness-based game schedule for the user to follow, to encourage increased activity and intensity as the user's body weight or mass decreases (i.e. as their percentage of progress towards achieving the training goal increases). The system may also include a virtual coach to help the user in their weight loss journey. A user may participate in virtual weight loss groups and/or rooms to encourage participation and support through interacting with other users with similar training goals. Weight loss may also be encouraged through badges, virtual gifts, streaks, and other virtual achievements.

Training goals may also be directed toward education. Specific games and activities may integrate educational concepts (e.g. a jumping game that helps users learn a new language). The same social interactions and virtual achievements in the weight loss example may also apply to a user's journey with an educational goal.

Additionally, the outputs may also be used to assess a user's technique when performing an activity or movement (i.e. their quality of movement). Wherein the carrier unit is an insole containing pressure sensors, a user's underfoot pressure distribution may be recorded and stored in the system memory for an activity, such as running. As further data is collected for the user, the system may compare previous data against new data to determine differences in technique to notify the user of fatigue or of a potential injury. Alternatively, the system may compare data contralaterally (i.e. between opposing limbs) to determine differences in technique. To assess technique, a machine learning model may be trained on data that includes both "correct" and "incorrect" versions of an activity. In implementation, the model can then classify an activity as "correctly" or "incorrectly" performed. Alternatively, the model can be trained on data that includes rankings (e.g. by a clinician or sports scientist) on technique of certain activities (e.g. a 0 to 5 ranking, where 0 indicates that an activity was poorly executed and where 5 indicates that an activity was perfectly executed). In implementation, the system can reject exercise tasks below a certain ranking and/or output the ranked value. In another example, technique can be assessed based on conditions or restrictions set for each activity. For example, if a drop jump is the task being assessed, there may be a cut-off time to stabilization used to assess movement quality (e.g. 8 seconds). A user's outputs can be used to determine if the condition was met (i.e. if their center of pressure stabilized within 8 seconds). If the user does not meet the condition or restriction, their technique may be deemed unacceptable.

In a further example, outputs may also be used to determine a user's "readiness" to participate in a game or activity. At either intermediate or specified points in time, an exercise may be given to a user to assess their state of "task readiness". The exercise may include a jump, squat, balance, sprint, series of steps, or another physical exercise. The exercise may be included as part of a game or challenge or may be separate from game play. Task readiness refers to a user's ability to perform a task at a moment in time. Injury potential, technique, and/or fatigue state of the user may be incorporated in a task readiness score or may be pulled out of the task readiness score and displayed as a separate score. The task readiness, injury potential, technique, and/or fatigue state scores may be recorded over time and may be displayed in a metrics report. The metrics report may be used to quantify improvements and overall fitness. The real-time readiness scores of the user may be reported to the user on the input device 102, remote processing device 108, or cloud server 110. For example, on a display of the remote processing device, a poor task readiness score may be reported as a red bar, an average task readiness score as a yellow bar, and a good task readiness score as a green bar in the top corner of the display. The task readiness feedback may alert the user to a deteriorating quality of their movements, which can be used to make an informed decision on continuation of game play. The task readiness scores may be used to recommend games that are appropriate for the user's physical state (e.g. their fitness level) at a certain point in time. For example, consistently high task readiness scores over a period may indicate that a user should play more advanced games to improve their fitness level. The system may recommend more advanced games to the user or higher-level players to compete against. The task readiness scores may also be used to recommend rest periods for the user or to coach the user through auditory, visual, or tactile means. For example, a virtual coach may be used to instruct the user on how to improve movement quality to gain more points, prevent injury, or achieve another goal in the game.

A virtual coach may be used to assist a user with meeting their training goals. The virtual coach may be trained through machine learning or other algorithms to give suggestions, notifications, and encouragement to the user relating to the training goal. Alternatively, a personal trainer, physiotherapist or other expert in the field may assess a user's historical outputs to develop and suggest training goals and paths to achieving training goals within the game.

Feedback may also be provided to users based on their outputs, their training goals, their task readiness, and their technique. For example, if a user goes on a run and the system calculates significant bilateral asymmetry for the vertical ground reaction force (vGRF) between the user's left and right foot, they may be provided with feedback to correct the asymmetry. Feedback may be provided in the form of haptic feedback, such as with vibrational motors embedded in the carrier unit.

Feedback may also be provided in the form of an audio signal. A user's outputs may be sonified and played in real-time or post-activity for the user. For example, if a user goes running, their vertical ground reaction force (vGRF) can be sonified and played in real time. The user can then sonically identify changes in their technique, and they can make real time adjustments to their running technique to maintain or improve their performance. Signal processing techniques may be used to increase the effects of sonification. For example, signals may be amplified, such that the sonification spans a broader range of tones than an unamplified signal, which may make it easier for users to identify changes in tone. Signals may also be layered. For example, the signals from the right and left foot may be added together prior to sonification, or the sonifications from the right and left foot may be played simultaneously. Signals may also be filtered to minimize noise, which may be distracting to a user once the signal is sonified. Visual feedback may also be provided by the system.

Users may review their feedback and data (e.g visualizations, sonifications, and haptics) during or after an activity. Real-time feedback may encourage users to continue to engage with the activity at a higher level of intensity or to increase their intensity. Post-activity data reviews may encourage users to understand their activity and movement statistics to prepare for improvements in the next activity.

Sonification of outputs may also be used for artistic purposes. For example, foot gestures and outputs may correspond to certain musical features, such as notes, instruments, tempos, and volumes. In a particular embodiment, a foot stomp may create the sound of a snare drum. A user's center of pressure may control volume (e.g. a shift in weight to the user's toes may increase the volume and a shift in weight to the user's heels may decrease the volume). Users may work together to create music. For example, if two users play a movement-based game, one user's sonification may create a melody and the other user's sonification may create a harmony. In this regard, users can generate music in real time with their bodies. Similarly, users, such as DJs, may be able to mix music in real time. They may use foot gestures to cue tracks and increase or decrease the speed of tracks.

Foot gestures may also be used to create a form of art for display. For example, a user may be able to "paint" with their insoles by applying pressure in various areas of the foot and using foot gestures to create different "brush strokes". In another example, a large display screen may be used to show a user's movements and dance moves while they are performing, using the outputs from the insoles.

Additionally, information may be communicated to and/or between users through visual, audio, or haptic cues. For example, the system may send a haptic cue to a user's insoles to prompt them to complete a daily challenge based on their outputs. The results of their daily challenges may be compared with the results of other users. Alternatively, if cues are sent between users, a first user in a game can challenge a second user in the game to perform an activity by sending a haptic cue to the second user's carrier unit. The communicated information may be based upon the two users' outputs. For example, the first users may send a haptic cue to the second user to challenge them to a run, where the user with the best vertical ground reaction force symmetry during the run will be declared the winner.

Users may also be able to create levels or challenges for other users based on their outputs. For example, a first user may create a challenge that involves running up a steep hill. If a second user wishes to perform the challenge, they will be required to produce outputs (such as vertical ground reaction force) that indicate that they performed an equivalently challenging or more challenging task (i.e. running up a steeper hill).

The performance scores and/or outputs may be displayed on an output device, as part of the remote processing device 108 or cloud server 110. A user may also be able to interact with a visual display via an interactive medium (e.g. a touchscreen) on the output device. Examples of data visualizations that may be provided on the visual display based on performance scores and/or outputs of a user using the carrier unit include: foot pressure maps to show the pressure distribution on the insoles, foot pressure maps to show the movement of the center of pressure, points displays (e.g. performance score), pop-up notifications of errors in movement, pop-up notifications with suggestions to correct the movement, graphs showing changes in data over time, colour codes (e.g. different colour pop-ups for different performance scores or gestures), footprints whose shapes are estimated based on a user's outputs, footprints whose depths are estimated based on a user's outputs, cumulative displays (e.g. accumulation of energy expenditure, which, when a certain level is reached, may be used to provide a burst of power for an avatar in a game), or any combinations thereof. The data visualizations may be altered or enabled or disabled by users, with toggles, buttons, or other actions.

The output device may also display information (such as names, outputs, etc.) of other users in the same area using the same type of system. Carrier units may contain GPS systems or other location-sensing systems to enable viewing information of other users in the same area. Location-sensing may provide opportunities for virtual social interactions between users. Examples of social interactions include gift exchanges, meet-ups in virtual rooms, messaging, game challenges, cooperative games, competitive games, combination games (i.e. games with a competitive and cooperative aspect), tournaments, leaderboards (e.g. for age groups, geographic locations, specific games, etc.), and the ability to "follow" and/or "friend" other users (i.e. adding users to a list of "friends" on the system platform). Other virtual social interactions known in the art, but not listed here, may also be included.

Virtual meeting rooms are digital areas where users may send messages or chats with one another, play games together, and participate in social interactions with other users. The system may have virtual meeting rooms available, or users may create and design their own virtual meeting rooms. The owner of a virtual meeting room may allow open access to the virtual meeting room, or they may restrict access to certain users. The owner may invite users to join their virtual meeting room.

Social interactions may also include competitive races against the outputs or performance scores of the same user (i.e. their previous scores), other users, a "computer", celebrities and/or professionals. For example, a user may enable a "ghost" mode, where they can view their previous performances when repeating an activity, to compete against themselves. For example, in a game where a user is required to perform an explosive jump to break the ground underneath their avatar, they can view a "ghost" of their avatar's best performance while repeating the activity, along with a display window showing the ghost's outputs, to encourage them to match or improve the jump. In another example, in a virtual golf game, the user may enable "ghost" mode to view the center of pressure movement of a professional golfer, who recorded their center of pressure in the game for other users to copy. The user can work towards matching the professional golfer's data to improve their own performance. In another example, a professional runner may create a virtual competition where users can compete against the professional for a month-long running challenge. The participating users' outputs can be compared to the professional's outputs to determine if any of the users beat the professional. Users who participate in and/or win the challenge may receive a virtual reward.

Referring now to FIG. 4, shown therein is an example method 400 of predetermining estimation weights, which may be used to synthesize sensor readings, for example using method 300. Reference will also be made concurrently to FIGS. 5 and 6 which illustrate an example of the method 400 in the context of a plurality of pressure sensors arranged in an insole.

At 410, training data can be obtained. The training data can include a plurality of sets of physical sensor readings from physical sensors arranged according to both the first and second predetermined patterns.

In some examples, the training data may be acquired using a dense sensor array. For example, the training data may be acquired using a dense sensor array that is capable of acquiring sensor readings at all of the locations included in both the first and second predetermined patterns.

In some examples, the sensor readings acquired by the dense sensor array may not be aligned precisely with all of the locations included in both the first and second predetermined patterns. In such examples, various methods of interpolation or extrapolation may be used to determine the training data to include a plurality of sets of sensor readings at locations arranged according to both the first and second predetermined patterns. Given the increased density of sensors in the dense sensor array, the error in the estimated sensor readings used for the training data can be minimized.

In some examples, the sensor readings acquired by the dense sensor array may be spatially normalized to correspond to the configuration of the sensor array that is being optimized for. For example, where the dense sensor array is acquired using a carrier unit of a specified size, the sensor readings may be spatially normalized to optimize for a carrier unit of a different size. This may allow the training data acquired from users using different sizes of sensor units (e.g. sensor units for different sizes of insole) to be applied to sensor units of varying sizes (e.g. varied sizes of insoles worn by different users). This can allow the same training data to be used to determine estimation weights for different sizes of sensor arrays using discrete sensors.

Figure 5:
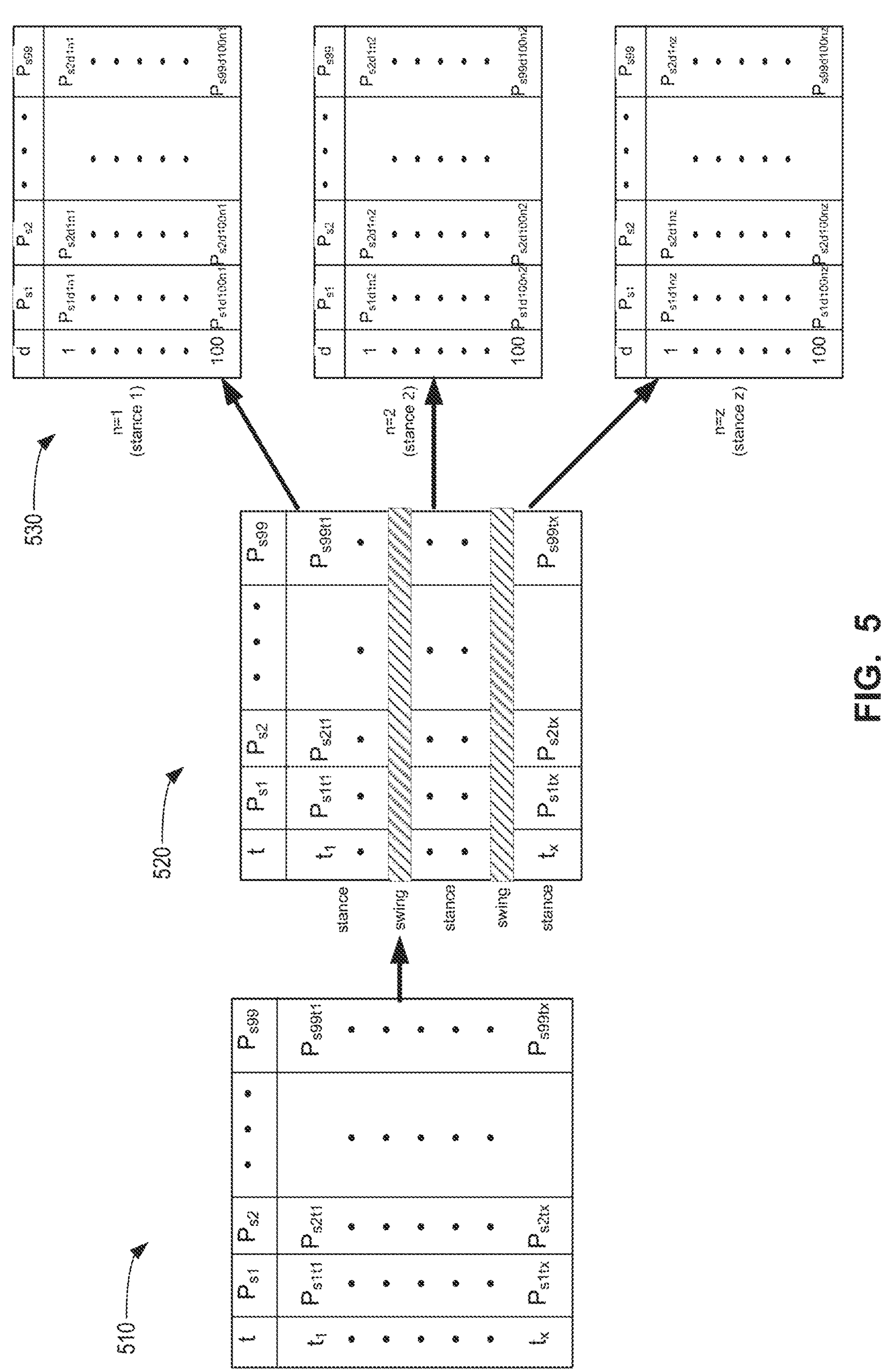
FIG. 5 is a flowchart illustrating an example of a method for obtaining filtered training data that may be used with the method shown in FIG. 4.

For example, as shown at step 510 in FIG. 5, pressure sensor data can be acquired from a user wearing insoles containing a dense pressure sensor array (e.g. a Pedar® insole or Tekscan® system). As shown in FIG. 5, the pressure sensor data includes pressure sensor data from a plurality of numbered pressure sensors ($P_s$) over time $t_1$-$t_x$.

Figure 6:
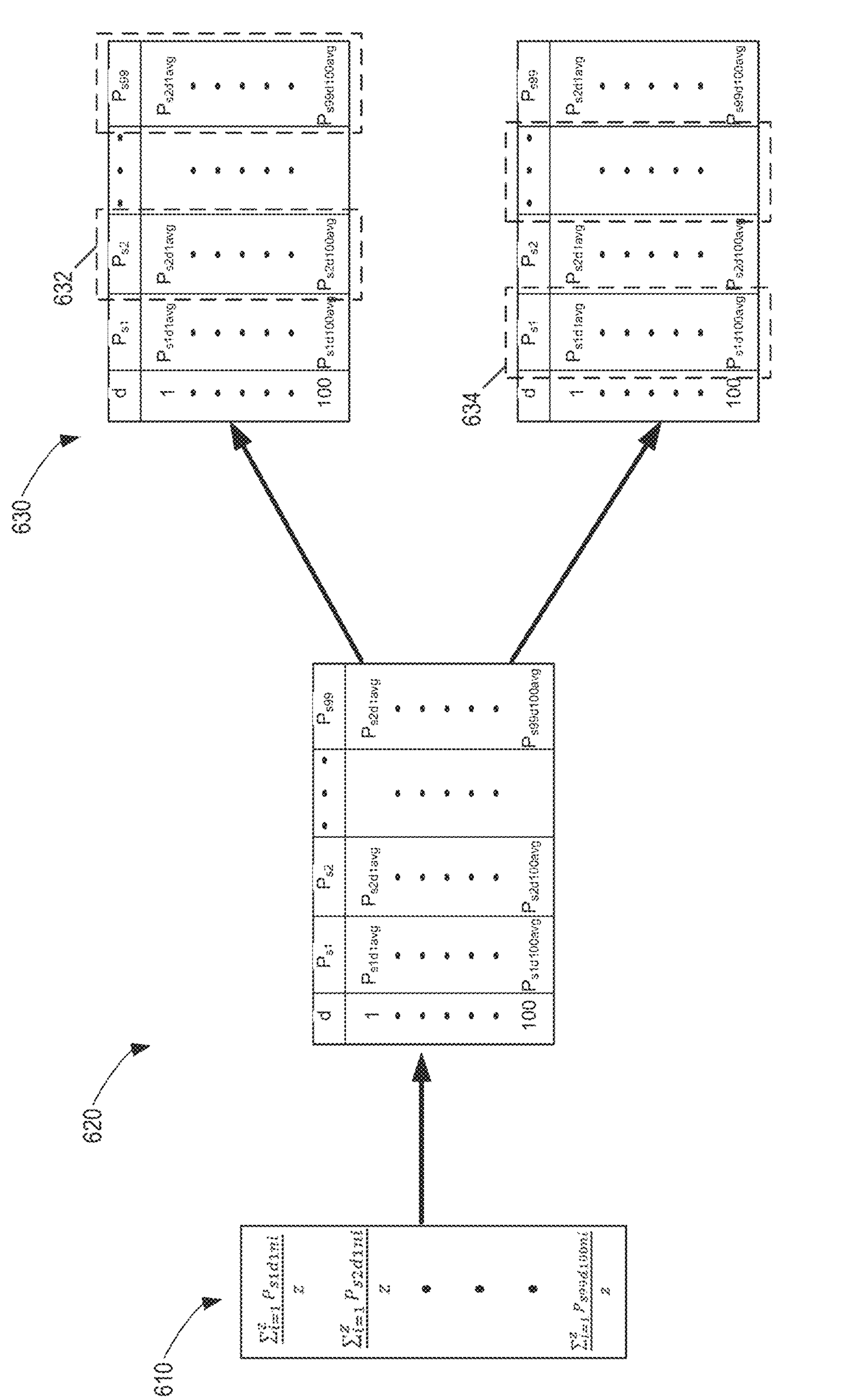
FIG. 6 is a flowchart illustrating an example of a method for producing an input data set and a reference data set that may be used with the method shown in FIG. 4.

Pressure sensor data can be acquired from multiple users over a series of strides. The example process illustrated in FIGS. 5 and 6 illustrates an example of acquiring and filtering pressure sensor data from a single user running in a specified running condition (e.g. running at a set speed and a set incline on a treadmill). The example process shown in FIGS. 5 and 6 (at least up to step 620) may be repeated for multiple users and/or multiple running conditions.

Alternatively, pressure sensor data can be acquired from multiple users performing other types of foot gestures, such as jumps, steps, kicks, foot taps, slides, balances, hops, spins or a combination of these. Foot gestures may also include dance moves, such as jumps (jetés, pas de chat, sissonnes, tours en l'air, beats, assembles, etc.), turns (pirouettes, chaîné turns, fouetté turns, etc.), extensions (battements, tilts, illusions, penchés, fan kicks, etc.), steps (shuffles, flaps, steps, stamps, stomps, toe taps, paradiddles, cramp rolls, glissades, pas de bourrée, chassés, ball changes, relevés, frappés, etc.), grooves (body rolls, crouches, moonwalks, isolations, shuffle steps, jacks, top rock, floor work, etc.), or a combination of these.

Referring back to FIG. 4, at 420, the training data can be filtered to obtain filtered training data. For example, filtering the training data can include removing or omitting data acquired at time periods where little or no relevant sensor readings were acquired.

For example, training data may be collected relating to a gait cycle (e.g. walking or running) performed by a user. In such cases, filtering the training data may include dividing the training data into stance data and swing data. The stance data can be identified as data corresponding to periods when the user's foot is, at least partially, in contact with a surface such as the ground. The swing data can be identified as data corresponding to periods when the user's foot is not in contact with the surface (e.g. as a user's foot swings in the air between steps).

In the example of an insole equipped with pressure sensors, the training data acquired at 510 can be separated into the two gait phases by analyzing the pressure sensor readings to detect foot contact and toe off periods. The time periods between foot contact and toe off can be identified as stance phases while the remaining time periods can be identified as swing phases. Typically, the swing phase may not provide meaningful pressure data because the user's foot is off the ground and is applying minimal pressure to the insole. Accordingly, the training data acquired during the swing phases may be eliminated (i.e. removed or omitted) in order to provide the filtered training data at 520.

Filtering the training data can also include resizing each instance of the training data to a common size. An instance of the training data may refer to a specified subset of the training data that is acquired. Multiple instances of training data can be acquired for the same (or substantially similar) human actions or movements.

For example, training data may be acquired over an extended period of time during which a user performs certain motions or actions multiple times. The training data may also be acquired for multiple users. An instance of training data may refer to the portion of the training data for a single user performing a specified motion or action a single time.

For example, the training data for each individual stride (for a given user) may be referred to as an instance of the training data. Each instance in the set of stance data may then be resized to a common size as shown at step 530 (where d represents a time step in an individual stance and z represents the total number of individual stances in the training data). In the example illustrated in FIG. 5, the dataset for each stance instance is resized to a standard length of 100 data points. However, different common sizes may be used depending on the implementation.

Resizing each instance of training data to a common size may simplify the computational process of optimizing the estimation weights by ensuring that each instance includes the same number of data points.

Referring back to FIG. 4, at 430, an average sensor reading for each physical sensor can be computed for each physical sensor using the filtered training data. The average sensor readings for each sensor location can then be stored. The average sensor readings can be used to produce an input data set and a reference data set.

The input data set and reference data set may be determined based on the sensor pattern of a given plurality of sensors. Different input data sets and reference data sets can be generated from the same average sensor readings computed at 430. That is, average sensor readings may be associated with a given input data set or reference data set depending on the sensor pattern for a given sensing unit. For example, the input data set and the reference data set may be generated by assigning each average sensor reading to one of the input data set and the reference data set.

The input data set can be defined to include average sensor readings for sensors corresponding to the first predetermined pattern. That is, the input data set can include average sensor readings for sensors at the locations corresponding to the sensor pattern of the set of discrete sensors that is being optimized for. The input data set can thus represent the discrete sensor data from which sensor reading estimations can be calculated at interstitial locations during the process of optimizing estimation weights (see 440 below).

The reference data set can be defined to include average sensor readings for sensors corresponding to the second predetermined pattern. This reference data set can thus include average sensor readings for sensors at the void locations where there are no discrete sensors provided by the particular sensor pattern. Accordingly, the reference data set can include average sensor readings for the interstitial locations between the discrete sensors that will be used in the particular sensor pattern. The reference data set can also include average sensor readings for the external void locations outside of the discrete sensors that will be used in the particular sensor pattern. The reference data set can thus represent the high-fidelity sensor data at estimation locations to which sensor reading estimations can be compared during the process of optimizing estimation weights (see 440 below).

Referring again to the example of a set of pressure sensors mounted in an insole, average stance data can be determined from the pressure data for each stance identified at 530. An average pressure value can be determined for each time step and sensor location based on data from all of the stances collected (see step 610 in FIG. 6). This average stance data can be stored as a matrix whose size is based on the (optionally resized) number of time steps and the number of sensor locations. In the example illustrated at step 620 in FIG. 6, the average stance matrix is a 100×99 matrix, which includes an average pressure value for each time step and sensor location.

Each individual sensor location ($P_s$) can be allocated to an input data set 632 or reference data set 634 based on the sensor layout being used (i.e. the first predetermined pattern) as shown by step 630. The sensor locations corresponding to the first predetermined pattern can be assigned to the input data set 632 while the sensor locations corresponding to the second predetermined pattern (often the remaining sensor locations) can be assigned to the reference data set 634.

The average stance data can be determined at step 610 for an individual training session (e.g. a single user running under specified running conditions). The input data set 632 and reference data set 634 can be defined to include averaged stance data from multiple individual training sessions (e.g. multiple users and/or multiple running conditions).

Alternatively, instead of preprocessing the training data (or filtered training data) to provide an average sensor reading, all of the training data could be separated into the input data set and reference data set. These expanded data sets may then be used in the optimization process at 440, albeit with a substantial increase in the computational expense of the optimization process.

At 440, the controller can optimize the estimation weights using the training data acquired at 410. The estimation weights can be optimized using the average sensor readings determined at 430.

Optimizing the estimation weights can include initially estimating the estimation weights. Estimated sensor values can then be determined using the estimation weights and the input data set. The estimated sensor values can be compared to the reference data set to determine the error in the estimated sensor values. An iterative optimization process can be used to determine the optimized estimation weights that minimize the error between the estimated sensor values and the reference data set.

For example, gradient descent optimization can be performed to update the estimation weights. The gradient descent optimization process compares the error between the estimated sensor values and the reference data set. Gradient descent optimization process can iterate until the error is minimized.

Method 400 may be performed once. For example, estimation weights may be optimized at 440, and they may be used to synthesize sensor readings throughout the carrier unit's lifetime. Alternatively, method 400 may be repeated to continually improve the estimation weights throughout the wearable device's lifetime. For example, training data can continue to be collected throughout the wearable device's lifetime with a dense sensor array. A user may own a calibration mat or a wireless charging mat containing pressure sensors arranged in a dense sensor array, in communication with the input device 102, remote processing device 108, or cloud server 110. The pressure sensors in the dense sensor array may be load cells and/or strain gauges. Alternatively, piezoelectric, capacitive, or other piezoresistive sensors may be used. The mat may be a single unit, or it may consist of two units—i.e. one for each foot. The user can regularly collect training data using the mat, which can be used to tune the optimized estimation weights, to improve their accuracy for the user.

For example, the external void locations outside of the arrangement of discrete sensors on the carrier unit are harder to estimate than the interstitial void locations, as they must initially be extrapolated rather than interpolated. If a user stands on a mat with a dense pressure sensor array while wearing the carrier unit (e.g. a pair of insoles) and rolls their weight into the edges of their feet (particularly the medial and lateral edges), these pressures can be measured by the mat. The mat can communicate with the system 100 to improve the estimation weights for these locations.

Using a dense sensor array to continually improve estimation weights, particularly at external void locations, may also allow a user with a smaller shoe size to use a larger pair of insoles. For example, if a user borrows a pair of insoles from a friend, but their shoe size is one size smaller than their friend's, a dense sensor array, such as in the form of a mat, can be used to adjust the estimation weights for the user with the smaller shoe size. As a result, values can be extrapolated beyond the size of the user's foot, to make their sensor readings and/or synthesized sensor readings appear as though they are one shoe size larger than they really are. The extrapolation may be valuable in a gaming scenario, for example, where a user is required to activate a certain sensor to perform an action in a game. If the user cannot activate the sensor (e.g. a sensor in the toe) because their feet are too small, a value can be extrapolated for the sensor and the surrounding void locations, to make it appear as though the user is activating the sensor. Alternatively, it may be possible to reduce the sensing region requiring activation to a smaller size. For example, rather than requiring the outermost sensors to be activated to execute a certain control in the game, the next row in of sensors can be activated.

Additionally, method 400 may be repeated to determine estimation weights for different foot gestures. For example, at 410, training data can be collected that corresponds to a dance move (e.g. ball change). The estimation weights calculated at 440 will then correspond to that dance move. When a user goes to play a dance game, the system can use the estimation weights calculated from the dance move. Likewise, at 410, training data can be collected for running. The estimation weights calculated at 440 will then correspond to running. When a user goes for a run, the system can switch from the dance move estimation weights to the running estimation weights, to synthesize sensor readings with higher accuracy during the run. Activity-specific estimation weights may increase the accuracy of synthesized sensor readings and pressure derivatives for specific activities.

Figure 7:
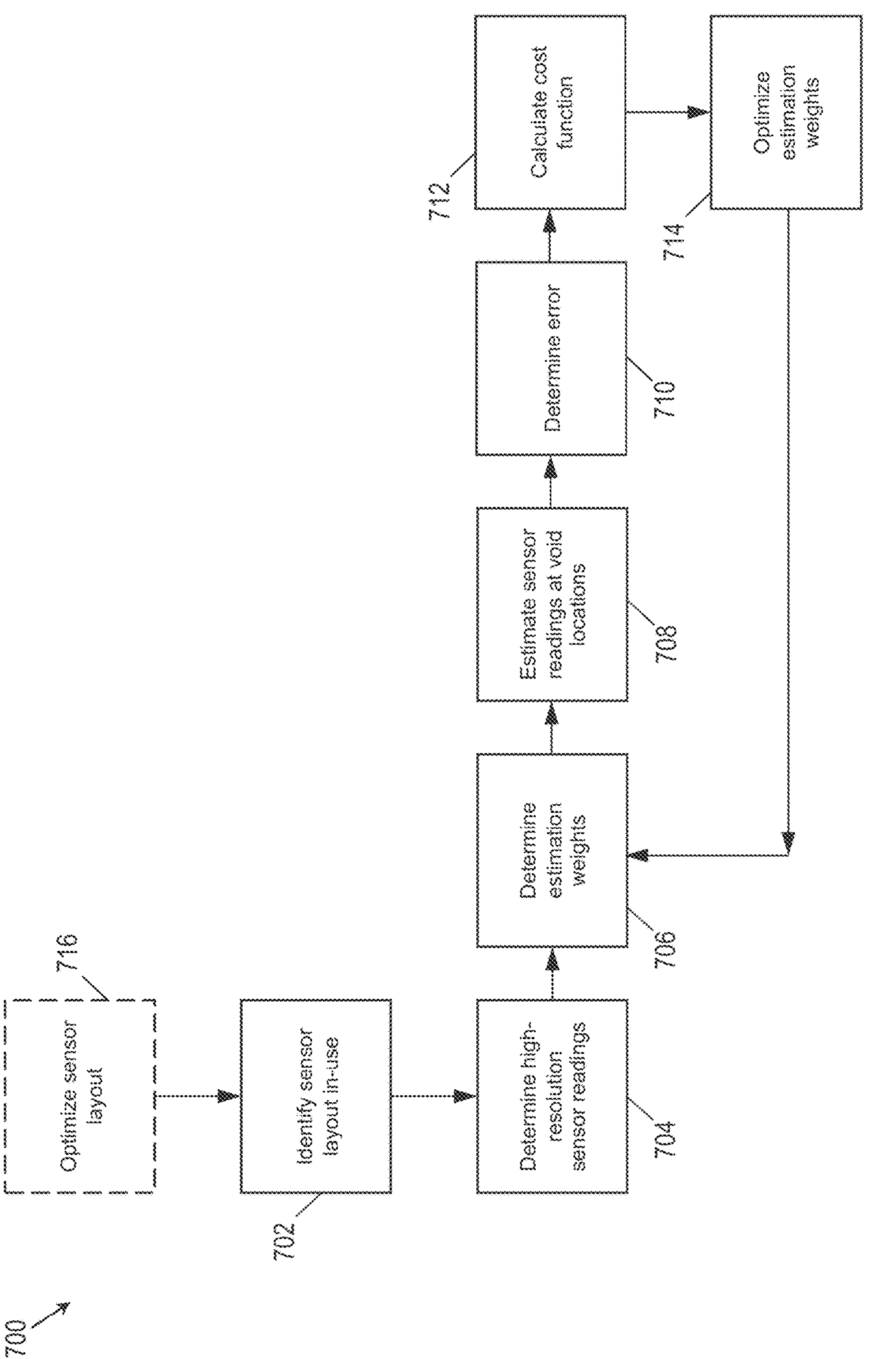
FIG. 7 is a flowchart illustrating an example of a method for optimizing estimation weights that may be used with the method shown in FIG. 4.

FIG. 7 illustrates an example process 700 for optimizing estimation weights. The optimization process 700 may be used in the systems and methods described herein, such as at step 440 of method 400.

At 702, the in-use sensor layout is identified. The in-use sensor layout generally refers to the first predetermined pattern that maps the plurality of sensors to respective locations on a carrier unit.

At 704, high-resolution sensor readings are obtained. The high-resolution sensor readings can be acquired using sensors positioned at each location in the first predetermined pattern and the second predetermined pattern. For example, the high-resolution sensor readings may be acquired using a dense sensor array (as described in the example of step 510 above). Rather than using a separate measurement system to make the discrete sensor measurements, measurements can be extracted from select locations on the dense sensor array grid to mimic the pattern of discrete sensors. This can facilitate efficient testing of numerous sensor patterns.

Alternatively, a separate system could be used to provide the discrete sensor measurements and the sensor measurements at the synthesized sensor locations. This may require the data from the discrete sensor system and the dense sensor array to be temporally- and spatially-aligned, as part of data preprocessing.

At 706, estimation weights can be determined. At 708, synthesized sensor readings can be estimated at the sensor void locations (i.e. at the interstitial locations and the external void locations). When the estimation weights are initially determined, steps 706 and 708 may occur simultaneously. Subsequently, steps 706 and 708 may occur serially as illustrated.

The estimation weights can include interpolation weights. For example, sensor measurements at the interstitial locations defined by the second predetermined pattern can be calculated by interpolation based on the sensor readings (from 704) at the locations of the discrete sensors used in the in-use sensor layout (identified at 702). Various methods of interpolation may be used, such as linear interpolation or cubic interpolation for example.

Through this initial interpolation, an initial set of interpolation weights can be defined. For example, linear interpolation produces interpolation weights for each interstitial location, which are multiplied by the measurements taken by neighboring discrete sensors to produce an estimate of the sensor measurement at the interstitial location.

The estimation weights can include extrapolation weights. For example, sensor measurements at the external void locations defined by the second predetermined pattern can be calculated by extrapolation based on the sensor readings (from 704) at the locations of the discrete sensors used in the in-use sensor layout (identified at 702). Various methods of extrapolation may be used, such as linear extrapolation for example.

Through this initial extrapolation, an initial set of extrapolation weights can be defined. For example, linear extrapolation produces extrapolation weights for each external void location, which are multiplied by the measurements taken by neighboring discrete sensors to produce an estimate of the sensor measurement at the external void location.

At 710, the estimated sensor measurements at the void locations are compared to the actual measurements taken at the same void locations using the dense sensor array. The difference between the estimated sensor estimates and the dense sensor array measurements can represent the error in the estimated measurements for the void locations. Error values can be determined for the estimated measurements at all void locations.

At 712, a cost function can be calculated based on the error values determined at 710. For example, the root mean square error (RMSE) of the estimated sensor readings can be calculated. This RMSE value can serve as the cost function for an optimization routine. Alternate cost functions may also be used, such as an absolute mean square error for example.

At 714, an optimization algorithm is then applied to optimize the estimation weights. The optimization algorithm can be defined to alter the estimation weights at the void locations to minimize the cost function determined at 712. Optimization methods such as the gradient descent method or least squares can be applied to minimize the cost function. Steps 706-714 can repeat iteratively until a local minimum is achieved.

The optimization method can be integrated into a linear machine learning model that is trained so that given an input (the first predetermined pattern) a desired output (the combined first predetermined pattern and second predetermined pattern) will be produced. Alternatively, nonlinear machine learning techniques (e.g. artificial neural networks) may be used to implement the optimization method. Alternatively, the optimization method may be implemented without a machine learning model, e.g. using regression analysis.

As described above, optimized estimation weights are applied to all synthesized sensor locations of the sensing unit. Alternatively, a hybrid estimation method can be used, where estimation weights are optimized and applied for a specified subset of the synthesized sensor locations, and traditional interpolation or extrapolation is applied to the remaining locations. This may provide a trade-off in terms of accuracy vs. reduced computation expense.

A hybrid estimation method may apply optimized estimation weights to selected synthesized sensor locations of the sensing unit while applying traditional interpolation or extrapolation to the remaining synthesized sensor locations. The selected locations may be identified based on a comparison of the accuracy of a traditional interpolation or extrapolation approach and the methods described herein using optimized estimation weights. The selected locations may be identified as those locations with the greatest difference in accuracy between the traditional interpolation or extrapolation approach and the methods described herein using optimized estimation weights.

Differences in accuracy between the traditional interpolation or extrapolation approach and the methods described herein using optimized estimation weights may be identified through testing (e.g. as shown in FIGS. 9A-9D described herein below). Those void locations corresponding to the greatest differences in accuracy (e.g. toe regions of the forefoot, foot arch regions of the midfoot) can be identified as the selected locations to which the optimized estimation weights can be applied.

Optionally, the sensing unit may include additional sensor layers. The additional sensor layers can be used to calibrate the primary sensor layer (i.e. the sensor layer for which synthesized sensor readings are being estimated) during operation, for example by having a user perform activities with known forces (such as standing on one leg). The primary sensor layer may include a sensor layout such as the example shown in FIGS. 2A and 2B. A secondary layer may be provided with an alternate sensor layout that can be used to tune the readings from the primary sensor layer.

For example, a secondary sensor layer may include a single, large sensor that covers most, or all, of the sensing area. This single large sensor can be used to detect time periods when relevant sensor readings may be expected. Taking the example of an insole input unit, the single layer sensor may sense a zero, or near-zero, level of pressure when a user's foot is lifted (i.e. not contacting a surface). When one of the user's feet is on the ground, the level of pressure may be determined based on the user's body mass and foot area, e.g. according to $$\text{pressure} = \text{bodymass} \times \frac{g}{\text{footarea}}.$$

When both of the user's feet are on the ground, the level of pressure may be determined based on the user's body mass and foot area, e.g. according to $$\text{pressure} = \frac{\text{bodymass}}{2} \times \frac{g}{\text{footarea}}.$$

The pressure values determined by the single sensor layer at these three times can be used to calibrate or tune the sensor readings from the first sensor layer.

Optionally, as shown at 716, an initial layout optimization process may be applied to optimize the first predetermined pattern of sensor locations. This can further reduce the error in the synthesized sensor readings. Various different optimization processes may be used in order to optimize the first predetermined pattern of sensor locations. For example, a genetic algorithm may be used in order to optimize the sensor layout for the first predetermined pattern.

The layout optimization process can include identifying the individual sensor location that produced the lowest pressure estimate error. A sensor is then assigned to that location. The sensor location where the next sensor could be added that would produce the lowest error can then be calculated, and a subsequent sensor assigned to that location. This process can repeat, adding sensors individually, until the total error fell within a predetermined acceptable error range. In some cases, sensor locations may be adjusted manually to account for design constraints of the carrier unit. The predetermined pattern shown in FIG. 2B is an example of an optimized sensor layout for an insole carrier unit.

EXAMPLES

Multiple implementations of the insoles described herein were tested. In particular, data was acquired from users wearing insoles with a plurality of pressure sensors. FIGS. 8A and 8B illustrate examples of the first predetermined patterns that were tested. The sensor layouts shown in FIGS. 8A and 8B are shown in an example of a size 10 shoe (US sizing) where the units of the x-axis and y-axis are millimeters.

Insoles using the sensor layouts shown in FIGS. 8A and 8B were tested on 20 users. Data was acquired from the 20 users running under 15 conditions (5 speed conditions and 3 slope conditions). The data was split into training and validation training sets (75%/25%) so that the training dataset consisted of 15 users and the validation dataset consisted of 5 different users under the same conditions.

During testing, the training dataset was used to teach a linear machine learning model to produce optimized estimation weights in accordance with the methods described herein. The linear machine learning model was then used to estimate sensor readings using the validation dataset and the estimated sensor readings were compared to the reference dataset.

Table 1 shows the resulting errors for both sensor layout patterns, and for the traditional methods of interpolation and extrapolation vs. the methods described herein:

TABLE 1

Mean and standard deviations of error for both sensor patterns and estimation methods.

| | First Test sensor pattern (FIG. 8A) using existing linear interpolation and extrapolation | First Test sensor pattern (FIG. 8A) using methods described herein | Second test sensor pattern (FIG. 8B) using existing linear interpolation and extrapolation | Second test sensor pattern (FIG. 8B) using methods described herein |
|---|---|---|---|---|
| Mean error (kPa) | 11.77 | 5.99 | 12.97 | 6.14 |
| Standard deviation of error (kPa) | 20.33 | 10.01 | 20.70 | 9.61 |

As table 1 shows, the mean and standard deviation of error decreased for both patterns between the traditional interpolation and extrapolation methods and the optimized estimation method described herein.

FIGS. 9A-9D illustrate a visual representation of error values acquired from testing of the test sensor patterns of FIGS. 8A and 8B following the collection of additional training data (as compared to the test results shown in Table 1). In FIGS. 9A-9D, the units of the x-axes and y-axes are millimeters, and the units of the error scale are kPa. As FIGS. 9A-9D illustrate, the methods described herein generate synthesized sensor readings with reduced error across all regions of the insole as compared to traditional interpolation.

Figure 9A:
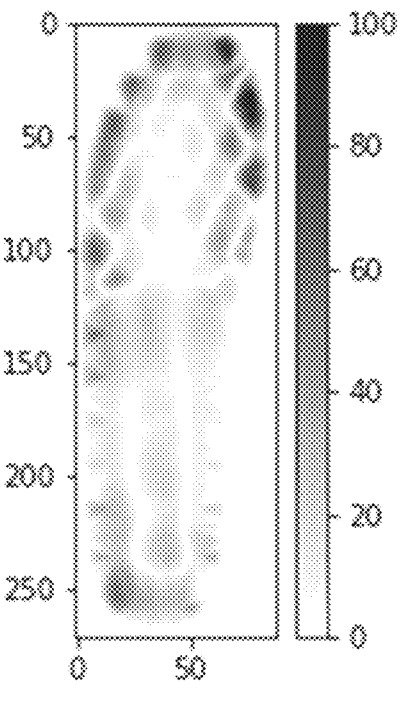
FIG. 9A is a diagram illustrating error values of synthesized sensor readings generated for a wearable device with the example test sensor pattern of FIG. 8A using traditional interpolation and extrapolation methods.
Figure 9B:
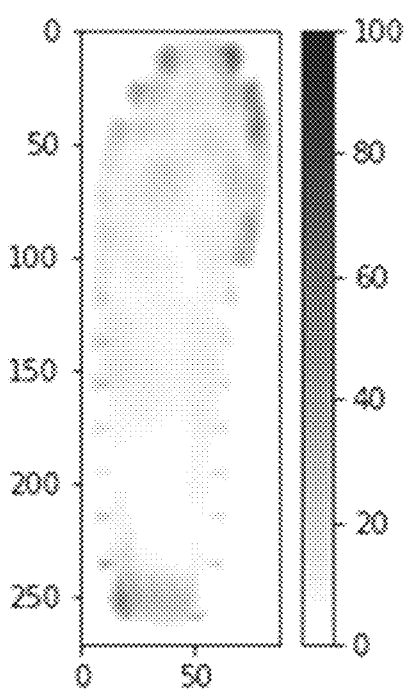
FIG. 9B is a diagram illustrating error values of synthesized sensor readings generated for a wearable device with the example test sensor pattern of FIG. 8A using an implementation of the method of FIG. 3.

FIG. 9A illustrates the error values of synthesized sensor readings generated for an insole with the test sensor pattern of FIG. 8A using traditional interpolation and extrapolation methods. FIG. 9B illustrates the error values of synthesized sensor readings generated for an insole with the test sensor pattern of FIG. 8A using the methods described herein.

From a comparison of FIGS. 9A and 9B, the error is clearly reduced when using the methods described herein. In particular, a reduction in error at the toe, midfoot and heel location is perceptible. This illustrates the improved accuracy of pressure estimates at small features, such as toe locations provided by the methods described herein.

There is also a clear reduction in the error around the perimeter of the insole in FIG. 9B as compared to FIG. 9A. This demonstrates the improved accuracy of pressure estimates at locations between the outermost pressure sensors and the edge of the insole compared to those calculated by traditional extrapolation.

Figure 9C:
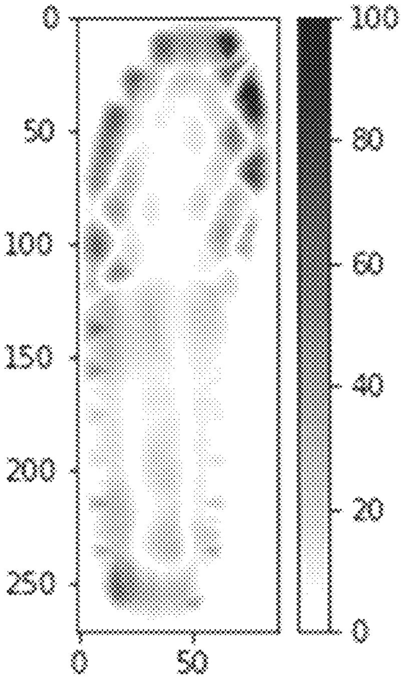
FIG. 9C is a diagram illustrating error values of synthesized sensor readings generated for a wearable device with the example test sensor pattern of FIG. 8B using traditional interpolation and extrapolation methods.

FIG. 9C illustrates the error values of synthesized sensor readings generated for an insole with the test sensor pattern of FIG. 8B using traditional interpolation and extrapolation methods. FIG. 9B illustrates the error values of synthesized sensor readings generated for an insole with the test sensor pattern of FIG. 8B using the methods described herein.

Figure 9D:
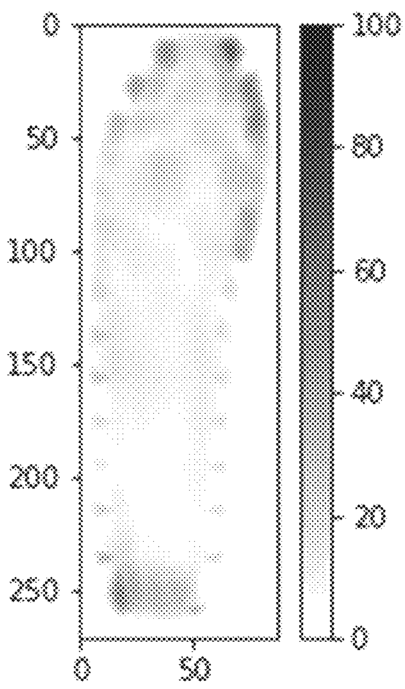
FIG. 9D is a diagram illustrating error values of synthesized sensor readings generated for a wearable device with the example test sensor pattern of FIG. 8B using an implementation of the method of FIG. 3.

From a comparison of FIGS. 9C and 9D, the error is clearly reduced when using the methods described herein. In particular, a reduction in error in the forefoot, midfoot, and heel region is notably perceptible. Again, there is also a clear reduction in the error around the perimeter of the insole in FIG. 9D as compared to FIG. 9C.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method for synthesizing sensor data in a wearable device, the method comprising:

obtaining a plurality of sensor readings from a corresponding plurality of sensors, the plurality of sensors arranged in a first predetermined pattern, wherein the first predetermined pattern maps each of the plurality of sensors to respective first locations on the wearable device;

based on the plurality of sensor readings and a plurality of estimation weights, estimating a plurality of synthesized sensor readings for a corresponding plurality of synthesized sensors, the plurality of synthesized sensors arranged in a second predetermined pattern, wherein the second predetermined pattern maps each of the plurality of synthesized sensors to respective second locations on the wearable device, wherein the second predetermined pattern includes at least one interstitial location between adjacent sensors of the plurality of sensors arranged in the first predetermined pattern and at least one location external to the plurality of sensors arranged in the first predetermined pattern, wherein a number of the plurality of synthesized sensors is greater than a number of the plurality of sensors; and generating feedback to a user using the synthesized sensor readings, the feedback comprising at least one of a vibrotactile signal, an audio signal, a visual display, and an avatar;

wherein the plurality of estimation weights are predetermined in a preprocessing phase that comprises: obtaining training data comprising training sensor readings measured at locations of both the first predetermined pattern and the second predetermined pattern; computing an input data set corresponding to the first predetermined pattern and a reference data set corresponding to the second predetermined pattern; and optimizing the estimation weights by gradient descent to reduce error between estimated sensor values and the reference data set.

2. The method of claim 1, wherein the plurality of sensors are pressure sensors.

3. The method of claim 2, further comprising computing at least one pressure derivative value based on the plurality of sensor readings and the plurality of synthesized sensor readings.

4. The method of claim 3, wherein the at least one pressure derivative value is a ground reaction force or a center of pressure.

5. The method of claim 3, further comprising outputting an output dataset, wherein the output dataset comprises the plurality of synthesized sensor readings and/or the at least one pressure derivative value.

6. The method of claim 5, wherein the output dataset is used as an input to a game.

7. The method of claim 1, further comprising filtering the training data, wherein filtering the training data comprises:

dividing the training data into stance data and swing data; and resizing each instance in the set of stance data to a common size.

8. A system for synthesizing sensor data in a wearable device, the system comprising:

a plurality of sensors arranged in a first predetermined pattern, with each of the plurality of sensors arranged at respective first locations on the wearable device; and one or more controllers communicatively coupled to the plurality of sensors, the one or more controllers configured to:

obtain a corresponding plurality of sensor readings from the plurality of sensors;

based on the plurality of sensor readings and a plurality of estimation weights, estimate a plurality of synthesized sensor readings for a corresponding plurality of synthesized sensors, the plurality of synthesized sensors arranged in a second predetermined pattern, wherein the second predetermined pattern maps each of the plurality of synthesized sensors to respective second locations on the wearable device, wherein the second predetermined pattern includes at least one interstitial location between adjacent sensors of the plurality of sensors arranged in the first predetermined pattern and at least one location external to the plurality of sensors arranged in the first predetermined pattern, wherein a number of the plurality of synthesized sensors is greater than a number of the plurality of sensors; and generate feedback to a user using the synthesized sensor readings, the feedback comprising at least one of a vibrotactile signal, an audio signal, a visual display, and an avatar;

wherein the plurality of estimation weights are predetermined in a preprocessing phase that comprises: obtaining training data comprising training sensor readings measured at locations of both the first predetermined pattern and the second predetermined pattern; computing an input data set corresponding to the first predetermined pattern and a reference data set corresponding to the second predetermined pattern; and optimizing the estimation weights by gradient descent to reduce error between estimated sensor values and the reference data set.

9. The system of claim 8, wherein the plurality of sensors are pressure sensors.

10. The system of claim 8, wherein the wearable device is worn on a foot.

11. The system of claim 8, wherein the one or more controllers is further configured to compute at least one pressure derivative value based on the plurality of sensor readings and the plurality of synthesized sensor readings.

12. The system of claim 11, wherein the one or more controllers is further configured to output an output dataset, wherein the output dataset comprises the plurality of synthesized sensor readings and/or the at least one pressure derivative value.

13. The system of claim 12, wherein the wearable device includes at least one vibrotactile motor, and the at least one vibrotactile motor is configured to generate a haptic signal based on the output dataset.

14. The system of claim 12, wherein the one or more controllers is further configured to generate an audio signal or a visual display based on the output dataset.

15. The system of claim 8, wherein the first predetermined pattern comprises at least 32 locations.

16. The system of claim 8, wherein the one or more controllers is wirelessly coupled to the plurality of sensors.

* * * * *